US012675494B2

(12) United States Patent
Rezaeian et al.

(10) Patent No.: US 12,675,494 B2
(45) Date of Patent: Jul. 7, 2026

(54) TECHNIQUES FOR DETECTING ANOMALOUS DATA POINTS IN TIME SERIES DATA

(71) Applicant: Oracle International Corporation, Redwood Shores, CA (US)

(72) Inventors: Amir Hossein Rezaeian, San Mateo, CA (US); Hariharan Balasubramanian, Redmond, WA (US)

(73) Assignee: Oracle International Corporation, Redwood Shores, CA (US)

( * ) Notice: Subject to any disclaimer, the term of this patent is extended or adjusted under 35 U.S.C. 154(b) by 473 days.

(21) Appl. No.: 18/242,291

(22) Filed: Sep. 5, 2023

(65) Prior Publication Data
US 2025/0077534 A1     Mar. 6, 2025

(51) Int. Cl.
*G06F 16/2458*     (2019.01)
*G06N 20/00*     (2019.01)

(52) U.S. Cl.
CPC ......... *G06F 16/2474* (2019.01); *G06N 20/00* (2019.01)

(58) Field of Classification Search
CPC .... G06F 16/2474; G06N 20/00; G06N 3/044; G06N 20/20
See application file for complete search history.

(56) References Cited

U.S. PATENT DOCUMENTS

| | | | | |
|---|---|---|---|---|
| 12,468,960 | B1 * | 11/2025 | Prabhakara | G06N 5/01 |
| 2023/0186075 | A1 * | 6/2023 | Dutta | G06N 3/045 |
| | | | | 706/15 |
| 2023/0205664 | A1 * | 6/2023 | Higginson | G06F 11/3433 |
| | | | | 702/186 |
| 2023/0368069 | A1 * | 11/2023 | Xu | G06N 3/045 |
| 2025/0307694 | A1 * | 10/2025 | Mahishi | G06N 20/00 |

* cited by examiner

*Primary Examiner* — Tyler J Torgrimson
(74) *Attorney, Agent, or Firm* — Kilpatrick Townsend & Stockton LLP

(57) ABSTRACT

Techniques for increasing the precision of machine learning models that are trained to detect anomalous data points in a time series. The techniques including methods and systems for training machine learning models offline, using the trained machine learning models to predict anomalies in an online runtime environment, and updating anomaly detection models in the runtime and offline environments. The machine learning models may include a multitask model for predicting one or more anomalous events present in input time series data, and for each identified anomalous event type, predicting a type of machine learning model that is best suited for predicting that anomalous event type. The models may further include model instances selected using the predicted one or more anomalous events present in the input time series data and the predicted anomalous event type and used to predict an anomaly event in the input time series data.

20 Claims, 13 Drawing Sheets

Figure 2:
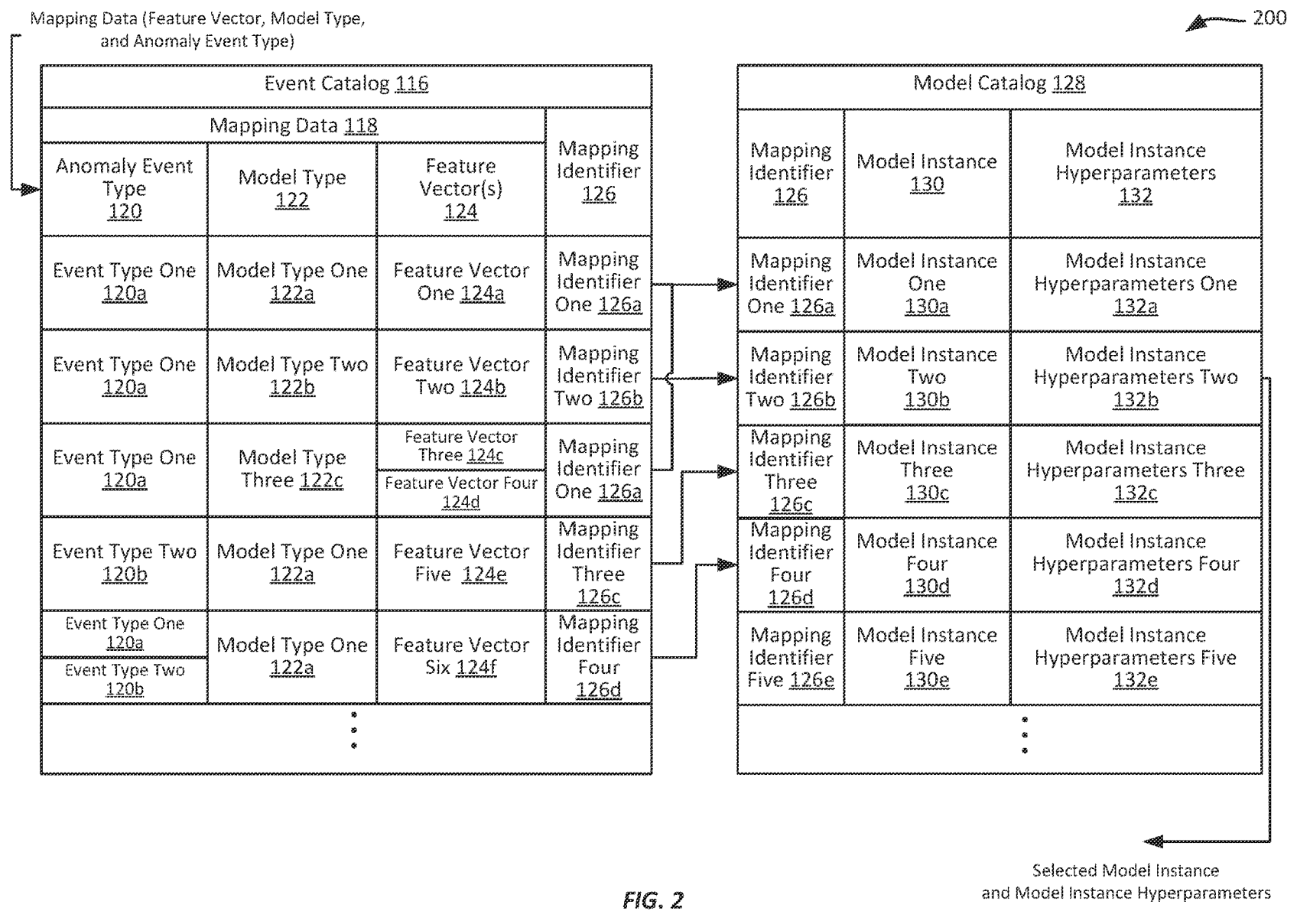

Mapping Data (Feature Vector, Model Type, and Anomaly Event Type)

Event Catalog 116

| Mapping Data 118 | | | Mapping Identifier 126 |
|---|---|---|---|
| Anomaly Event Type 120 | Model Type 122 | Feature Vector(s) 124 | |
| Event Type One 120a | Model Type One 122a | Feature Vector One 124a | Mapping Identifier One 126a |
| Event Type One 120a | Model Type Two 122b | Feature Vector Two 124b | Mapping Identifier Two 126b |
| Event Type One 120a | Model Type Three 122c | Feature Vector Three 124c / Feature Vector Four 124d | Mapping Identifier One 126a |
| Event Type Two 120b | Model Type One 122a | Feature Vector Five 124e | Mapping Identifier Three 126c |
| Event Type One 120a / Event Type Two 120b | Model Type One 122a | Feature Vector Six 124f | Mapping Identifier Four 126d |

Model Catalog 128

| Mapping Identifier 126 | Model Instance 130 | Model Instance Hyperparameters 132 |
|---|---|---|
| Mapping Identifier One 126a | Model Instance One 130a | Model Instance Hyperparameters One 132a |
| Mapping Identifier Two 126b | Model Instance Two 130b | Model Instance Hyperparameters Two 132b |
| Mapping Identifier Three 126c | Model Instance Three 130c | Model Instance Hyperparameters Three 132c |
| Mapping Identifier Four 126d | Model Instance Four 130d | Model Instance Hyperparameters Four 132d |
| Mapping Identifier Five 126e | Model Instance Five 130e | Model Instance Hyperparameters Five 132e |

Selected Model Instance and Model Instance Hyperparameters

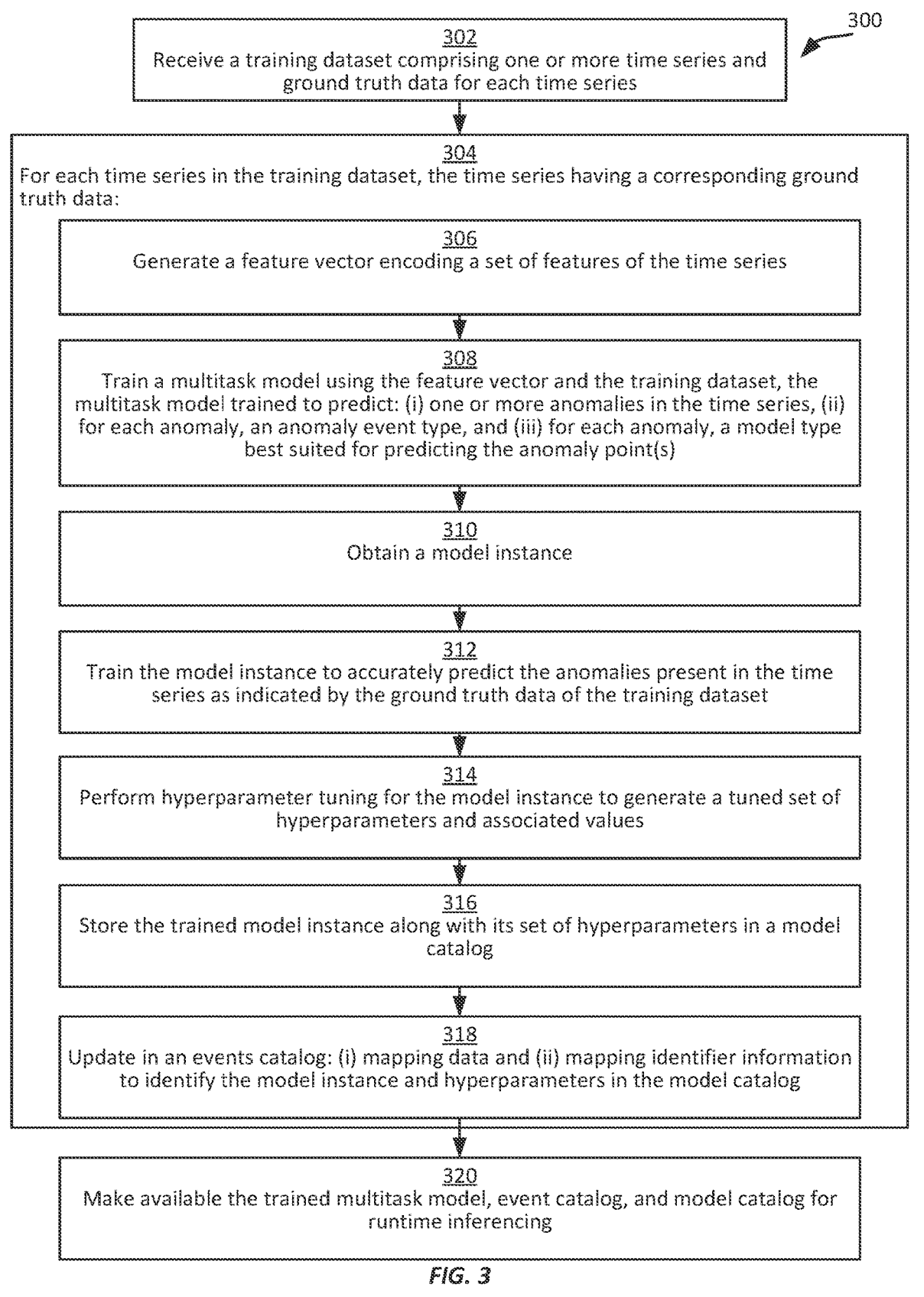

302
Receive a training dataset comprising one or more time series and ground truth data for each time series

304
For each time series in the training dataset, the time series having a corresponding ground truth data:

306
Generate a feature vector encoding a set of features of the time series

308
Train a multitask model using the feature vector and the training dataset, the multitask model trained to predict: (i) one or more anomalies in the time series, (ii) for each anomaly, an anomaly event type, and (iii) for each anomaly, a model type best suited for predicting the anomaly point(s)

310
Obtain a model instance

312
Train the model instance to accurately predict the anomalies present in the time series as indicated by the ground truth data of the training dataset

314
Perform hyperparameter tuning for the model instance to generate a tuned set of hyperparameters and associated values

316
Store the trained model instance along with its set of hyperparameters in a model catalog

318
Update in an events catalog: (i) mapping data and (ii) mapping identifier information to identify the model instance and hyperparameters in the model catalog

320
Make available the trained multitask model, event catalog, and model catalog for runtime inferencing

*FIG. 3*

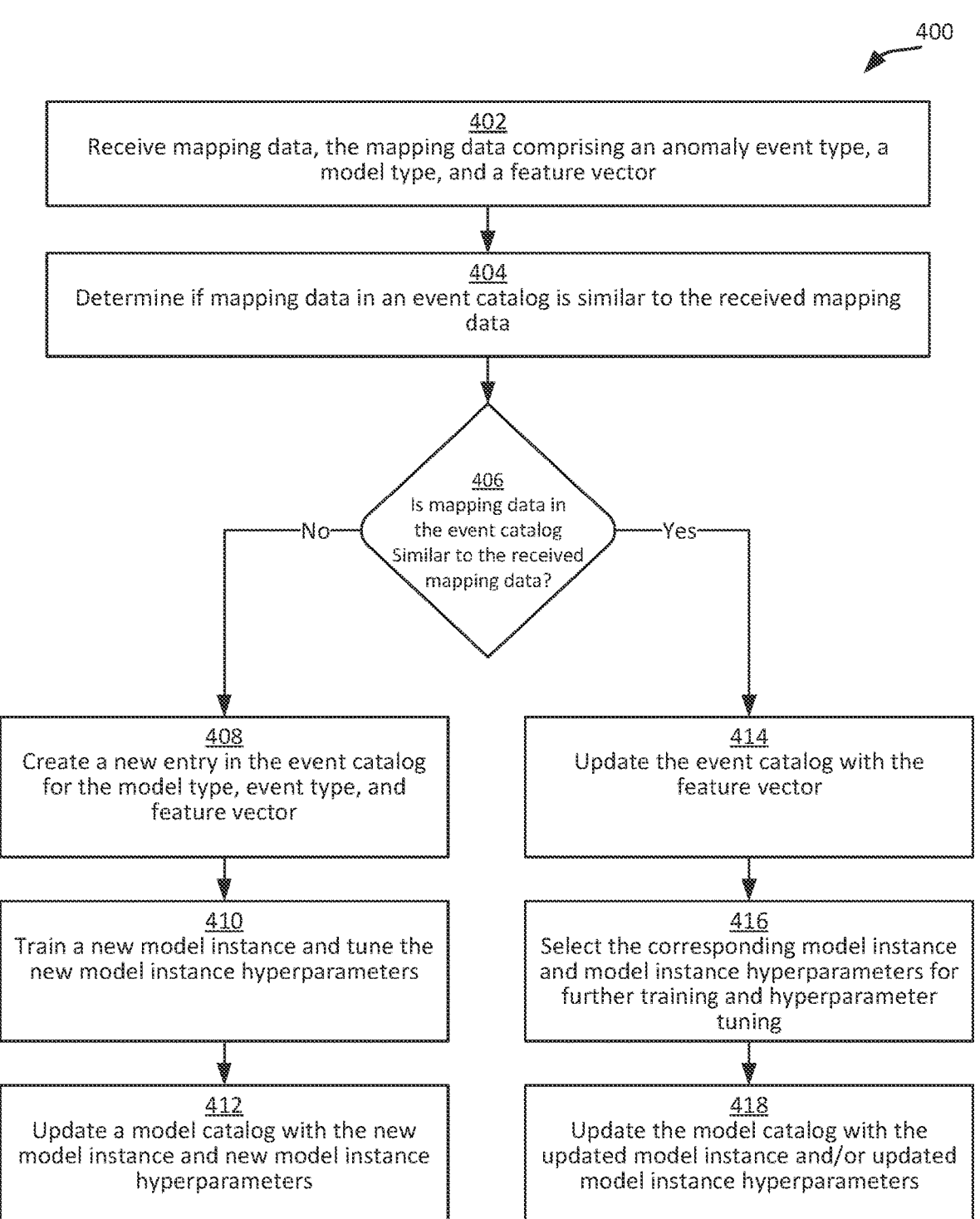

400

<u>402</u>
Receive mapping data, the mapping data comprising an anomaly event type, a model type, and a feature vector <u>404</u>
Determine if mapping data in an event catalog is similar to the received mapping data <u>406</u>
Is mapping data in the event catalog Similar to the received mapping data?

No

Yes

<u>408</u>
Create a new entry in the event catalog for the model type, event type, and feature vector <u>414</u>
Update the event catalog with the feature vector <u>410</u>
Train a new model instance and tune the new model instance hyperparameters <u>416</u>
Select the corresponding model instance and model instance hyperparameters for further training and hyperparameter tuning <u>412</u>
Update a model catalog with the new model instance and new model instance hyperparameters <u>418</u>
Update the model catalog with the updated model instance and/or updated model instance hyperparameters

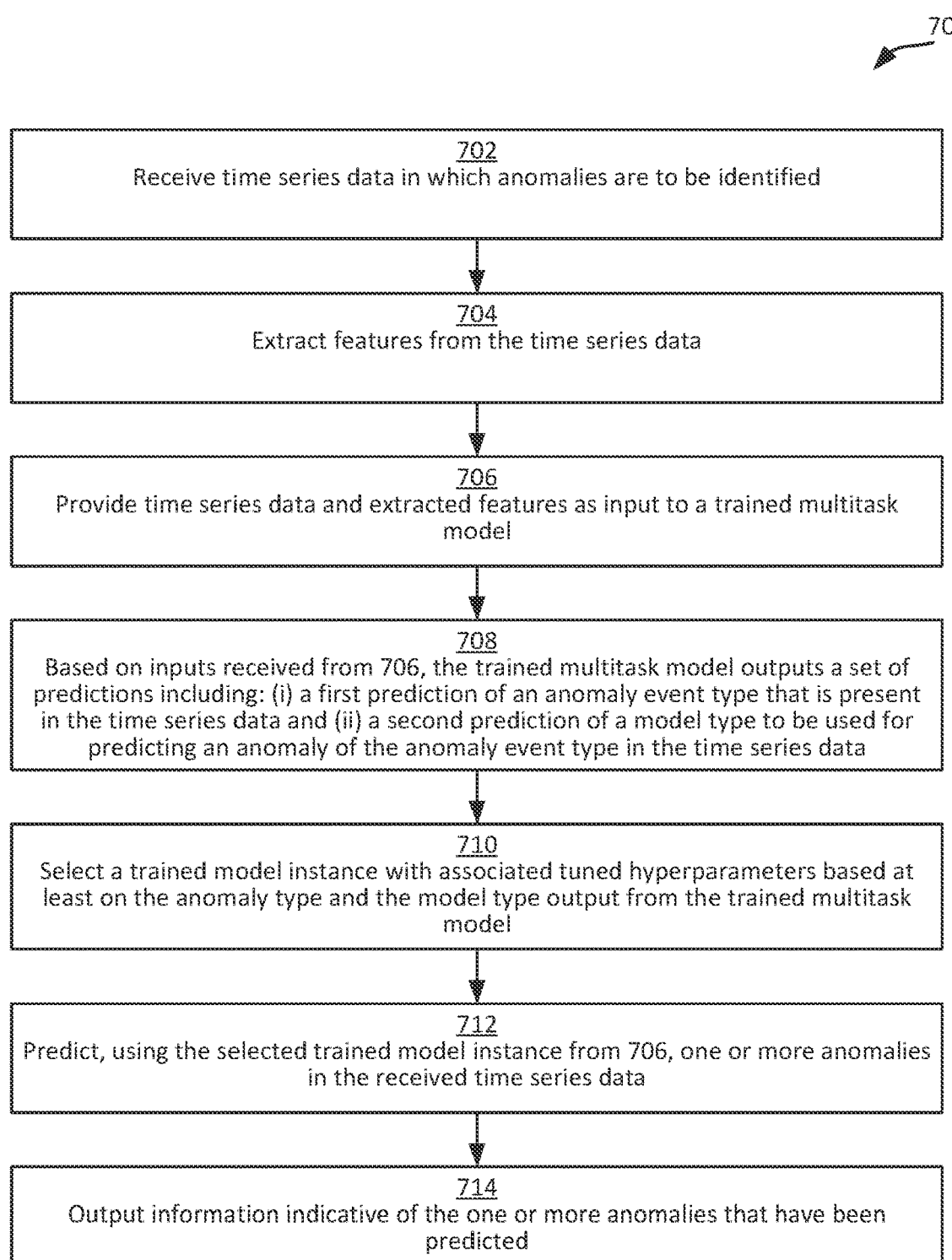

702
Receive time series data in which anomalies are to be identified

704
Extract features from the time series data

706
Provide time series data and extracted features as input to a trained multitask model 708
Based on inputs received from 706, the trained multitask model outputs a set of predictions including: (i) a first prediction of an anomaly event type that is present in the time series data and (ii) a second prediction of a model type to be used for predicting an anomaly of the anomaly event type in the time series data 710
Select a trained model instance with associated tuned hyperparameters based at least on the anomaly type and the model type output from the trained multitask model 712
Predict, using the selected trained model instance from 706, one or more anomalies in the received time series data 714
Output information indicative of the one or more anomalies that have been predicted

FIG. 7

TECHNIQUES FOR DETECTING ANOMALOUS DATA POINTS IN TIME SERIES DATA

BACKGROUND

Time series data is used in many applications. There are many processes that generate time series data. Time series data includes a sequence of data points collected over data at successive points in time. Each data point includes a time point and a value that is associated with that time point. Time series data may be generated in various different use cases and domains. For example, a sensor may be configured to detect a temperature reading every minute. The sequence of temperature values collected over time by the sensor represents a time series. As another example, a stock ticker that outputs a stock value every hour also represents a time series. As yet another example, sales data representing sales on a monthly basis also represents a time series.

Analyzing time series to identify different characteristics of the time series is important for several industries and domains. These characteristics may include trends, detection of anomalous events, and the like. More recently, machine learning models have been used to detect anomalous events in time series. However, there are several problems with current techniques for using machine learning models for detecting anomalous events. These problems lead to reduced accuracy in the detection of anomalous events and inconsistent results.

SUMMARY

The present disclosure relates to increasing the precision of machine learning models that are trained to detect anomalous data points in a time series. Embodiments described herein may include methods and systems for training machine learning models offline, using the trained machine learning models to predict anomalies in an online runtime environment, and updating anomaly detection models in the runtime and offline environments. Various embodiments are described herein, including methods, systems, non-transitory computer-readable storage media storing programs, code, or instructions executable by one or more processors, and the like. Certain embodiments may be implemented by using a computer program product, comprising computer program/instructions which, when executed by a processor, cause the processor to perform any of the methods described in the disclosure.

In certain implementations an anomaly detection system using a trained multitask model may predict a plurality of predictions for input time series data, the plurality of predictions comprising a first prediction identifying an anomaly event type present in the input time series data, and a second prediction identifying a model type to be used for the anomaly event type identified in the first prediction, the input time series data comprising a plurality of datapoints. Based on the anomaly event type identified in the first prediction and the model type identified in the second prediction, certain implementations use the anomaly detection system to select from a plurality of trained model instances, a first trained model instance, the first trained model instance having an associated set of selected hyperparameter values for a set of hyperparameters. Certain implementations may further have the anomaly detection system using the first trained model instance and the associated set of selected hyperparameter values predict a first anomaly event in the input time series data. Further, information may then be output indicative of the first anomaly event.

In certain implementations, a set of features are extracted from the input time series data, the predicting includes the anomaly detection system using the set of extracted features, and the selecting includes using the set of extracted features, the first predictions, and the second prediction to select the first trained model instance.

In certain implementations, the set of extracted features is compared to one or more extracted feature vectors associated with the first trained model instance and results in a similarity metric within a defined threshold.

In certain implementations, the first anomaly event comprises more than one datapoint from the input time series data. In certain implementations, the anomaly event type is at least one of: (i) a point-wise anomalous event type, (ii) a collective anomalous event type, or (iii) a contextual anomalous event type. The model type is at least one of (i) a one-call SVM model, (ii) an isolated forest model, or (iii) an LSTM-based model in certain implementations.

In certain implementations, training a baseline multitask model using a training time series dataset to generate the trained multitask model is performed and the training time series dataset comprises a plurality of anomaly-indicating training datapoints, each anomaly-indicating training datapoint comprising a time, a value, and a ground truth, the ground truth comprising an anomaly event type label identifying an event type for an event occurring in the training time series dataset and a model type label identifying a model type suited for the anomaly event type identified by the anomaly event type label. In certain implementations, training the baseline multitask model includes (i) predicting a first plurality of training predictions using the baseline multitask model, the first plurality of training predictions comprising a first training prediction identifying an anomaly event type present in the input time series data, and a second training prediction identifying a model type to be used for the anomaly event type identified in the first training prediction, and (ii) updating model parameters associated with the baseline multitask model based upon the first plurality of training predictions and the ground truth associated with the training time series dataset.

In certain implementations, the technique may further comprise using the trained multitask model, a second plurality of training predictions for the training time series dataset, the second plurality of training predictions comprising a first training prediction of the second plurality of training predictions identifying an anomaly event type present in the training time series dataset, and a second training prediction of the second plurality of training predictions identifying a model type to be used for the anomaly event type identified in the first training prediction of the second plurality of training predictions. The technique may further comprise obtaining a first model instance of the model type identified in the first training prediction in the second plurality of training predictions and training, using the training time series dataset, the first model instance to generate the first trained model instance. The training of the first model instance includes obtaining, for the first trained model instance, the associated set of selected hyperparameter values, and storing the first trained model instance and the associated set of selected hyperparameter values, in certain implementations.

In certain implementations, the techniques further comprise obtaining a training data feature vector from the training time series dataset, the training data feature vector used to obtain the first model instance. Further, in certain implementations, the techniques further comprise storing the training data feature vector, the first training prediction, and the second training prediction as mapping data and associating the mapping data with the first model instance. Further, the first model instance comprises comparing the stored training data feature vector associated with the first model instance to a set of extracted features from the input time series data in certain implementations.

In some implementations, the techniques further include identifying a set of one or more datapoints from the plurality of datapoints in the input time series data, and for each datapoint in the set of one or more datapoints: (i) outputting, information indicative of a prediction made by the first trained model instance for the datapoint, and (ii) enabling input to be provided with respect to the information output for the datapoint. In certain implementations, the identifying occurs based on at least one of: (i) a confidence score associated with the prediction made by the first trained model instance or (ii) an amount of time to label datapoints in the set of one or more datapoints associated with the prediction made by the first trained model instance.

In certain implementations, the datapoint is predicted to be part of the first anomaly event and the following processes are performed in response to receiving input indicating that the datapoint is not part of the first anomaly event: generating an updated first trained model instance, predicting, by the anomaly detection system and using the updated first trained model instance and the associated set of selected hyperparameter values, a second anomaly event in the input time series data, and outputting information indicative of the second anomaly event.

In certain implementations, the datapoint is predicted to be part of the first anomaly event and the following processes are performed in response to receiving input indicating that the datapoint is not part of the first anomaly event: generating an updated first trained model instance and an updated associated set of selected hyperparameter values, predicting, by the anomaly detection system and using the updated first trained model instance and the updated associated set of selected hyperparameter values, a second anomaly event in the input time series data, and outputting information indicative of the second anomaly event.

In certain implementations, the datapoint is predicted to not be part of the first anomaly event and the following processes are performed in response to receiving input indicating that the datapoint is part of the first anomaly event: generating an updated first trained model instance, predicting, by the anomaly detection system and using the updated first trained model instance and the associated set of selected hyperparameter values, a second anomaly event in the input time series data, and outputting information indicative of the second anomaly event.

In certain implementations, the datapoint is predicted to not be part of the first anomaly event and the following processes are performed in response to receiving input indicating that the datapoint is part of the first anomaly event: generating an updated first trained model instance and an updated associated set of selected hyperparameter values, predicting, by the anomaly detection system and using the updated first trained model instance and the updated associated set of selected hyperparameter values, a second anomaly event in the input time series data, and outputting information indicative of the second anomaly event.

In certain implementation, the techniques further include receiving input indicating that a model type identified in the second prediction is incorrect, and in response to receiving the input indicating that the model type identified in the second prediction is incorrect, fine-tuning the trained multitask model to create an updated trained multitask model.

The foregoing, together with other features and embodiments will become more apparent upon referring to the following specification, claims, and accompanying drawings.

BRIEF DESCRIPTION OF THE DRAWINGS

FIG. 2 is a simplified illustration of information included within an event catalog and a model catalog, according to an exemplary embodiment.

FIG. 3 is a simplified flow diagram for training, according to an exemplary embodiment.

FIG. 4 is a simplified flow diagram for updating an event catalog and/or a model catalog, according to an exemplary embodiment.

FIG. 7 is a simplified flow diagram performed by an anomaly detection system, according to an exemplary embodiment.

DETAILED DESCRIPTION

Figure 1:
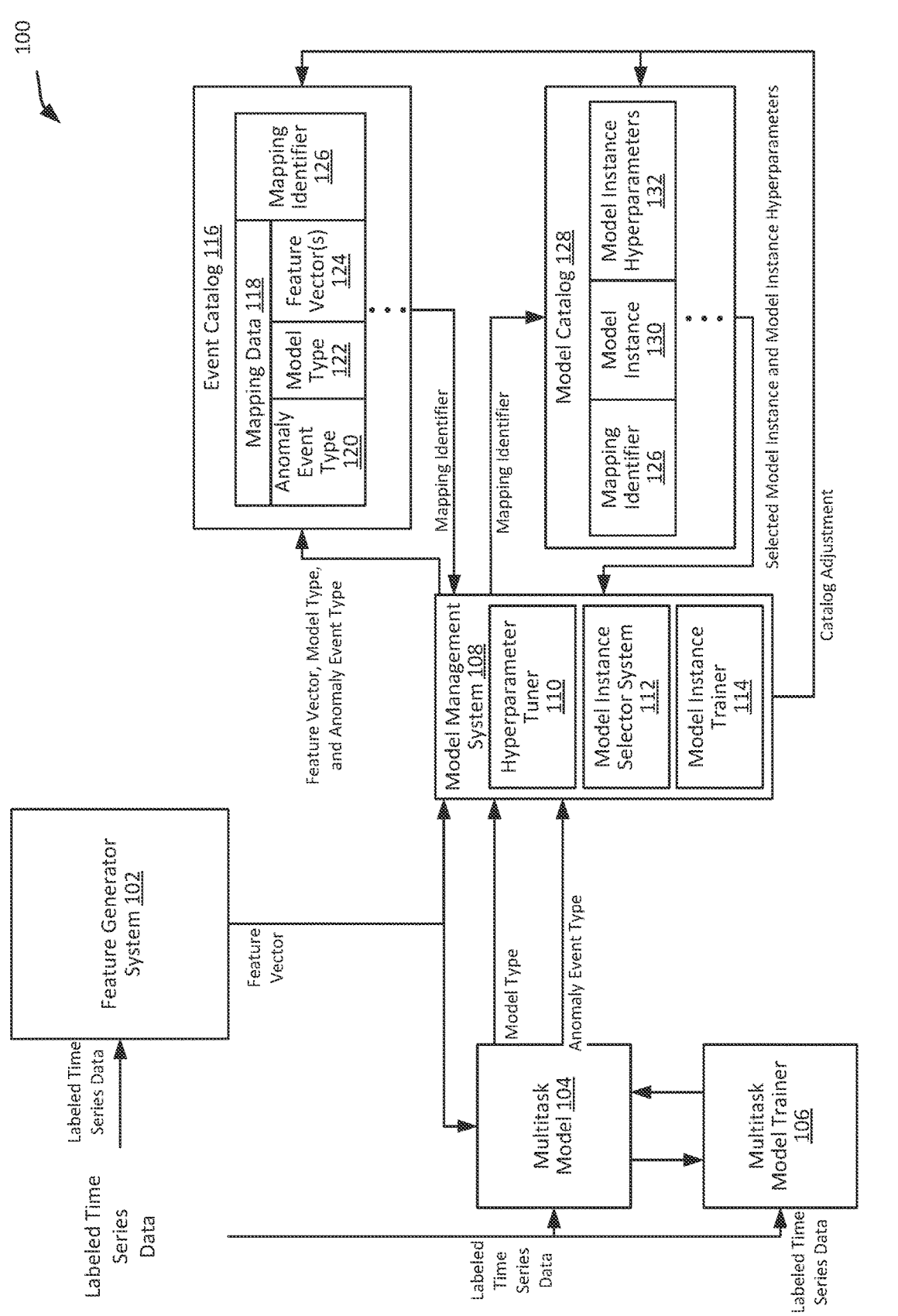
FIG. 1 is a simplified block diagram of a training environment, according to an exemplary embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates to detecting anomalous events in time series data using machine learning techniques. More specifically, improved techniques are disclosed that improve the accuracy of detecting anomalous events in time series data.

In certain embodiments, the improved techniques include enhanced offline training techniques that include training a multitask model to output predictions identifying one or more anomalous events present in the input time series data, and for each identified anomalous event type, predicting a type of machine learning model that is best suited for predicting that anomalous event type. Examples of anomalous event types may include a point-wise anomalous event type, a collective anomalous event type, a contextual anomalous event type, and others. The offline training further includes selecting a model instance of the predicted model type and training the selected model instance to predict anomalous events, where the training of the instance also includes selecting a set of tuned hyperparameters. Multiple trained instances of models and their associated set of selected hyperparameters are stored and made available for runtime inference usage. Additional trained instances of models may be initiated and stored based on whether which other trained instances exist and what event type, model type, and feature vector(s) they are associated with.

The trained multitask model and the trained model instances with associated selected hyperparameters are then used during a runtime phase for inferencing on runtime data. In certain implementations, an anomaly detection system is provided that uses the trained multitask model and the trained model instances with associated selected hyperparameters for predicting anomalies in input time series data.

In certain embodiments, during runtime, the trained multitask model is used to predict a model type and anomaly event type after being provided with time series data. The time series data, the model type, and the anomaly event type are then used to select a trained model instance and associated set of selected tuned hyperparameters to be used for predicting which one or more points within the time series data are anomalous events. Such a selection is made using an event catalog and a model catalog. The selected trained model instance and the associated set of selected tuned hyperparameters are then used with the time series data to predict which points in a time series are anomalous, and what type of anomaly they are.

In addition to outputting the time series data anomalous event predictions, multiple feedback techniques may be used to further improve the accuracy of one or more models described above. Thus, multiple feedback techniques are also disclosed herein. A user may provide feedback (e.g., labeling datapoints in time series data) that may be used to further configure information within the event catalog and model catalog in the runtime environment to further increase prediction accuracies. Predictions may be presented to the user based on user input (e.g., time available to the user) and/or confidence levels associated with predictions. Upon receiving user feedback (e.g., labeled ground truth time series data), the model instance used for predicting which one or more points within the time series data are anomalous events may be further trained in the runtime environment. Additionally, or alternatively, the labeled ground truth time series data obtained from user feedback may be used in the offline training environment to further train the multitask model and further configure the event catalog and the model catalog. The models trained in the offline environment may later be distributed to one or more runtime environments, thereby allowing a reduction of runtime latency There are several problems when predicting anomalous events within time series data. One problem is that predictions may be characterized by high false positive rates. High false positive rates may result from trained machine learning models being subjected to different interests and definitions of anomalous events which leads to assumptions, thereby causing undesirable prediction inaccuracies. Another problem is that anomaly detection models may struggle to effectively incorporate user feedback and/or be trained in a low latency runtime environment. Such problems may lead to increased processing times and/or further inaccuracies with predictions.

Additionally, problems exist regarding the ability for anomaly detection models to detect more than one type of anomaly. Such problems further lead to inaccuracies in predictions and application limitations.

The present disclosure describes techniques for solving the above-mentioned problems.

The foregoing, together with other features and embodiments will become more apparent upon referring to the following specification, claims, and accompanying drawings.

Offline Training

FIG. 1 is a simplified block diagram 100 of a training environment, according to an exemplary embodiment.

The training environment may be an offline training environment. An offline training environment may be a model training environment that is separate from the environment where the models are used to perform predictions (e.g., a runtime environment). One of ordinary skill in the art would recognize, with the benefit of the disclosure herein, that the offline training environment does not necessarily mean that the offline training environment is not connected to the internet or another network (e.g., LAN). Instead, the term offline training environment is merely meant to distinguish the environment from a separate environment (e.g., a runtime environment). By training one or more models (e.g., a multitask model 104, a model instance 130), partially or completely, in an offline training environment, the resources and time used in a runtime environment may be reduced compared to performing all model training, tuning, and predictions in one environment.

The offline training environment may be capable of offline training techniques that include training a multitask model (e.g., a multitask deep learning model) to output predictions identifying one or more anomalous events present in the input time series data, and for each identified anomalous event type 120, predicting a type of machine learning model that is best suited for predicting that anomalous event type 120. Examples of anomalous event types 120 may include a point-wise anomalous event type, a collective anomalous event type, a contextual anomalous event type, and others. Anomalous events may comprise one or more anomalous points. The offline training may further include training a model instance 130 of the predicted model type 122 to predict anomalous events, where the training of the model instance 130 also includes selecting a set of tuned hyperparameters 132. Multiple trained model instances 130 and their associated set of selected tuned hyperparameters 132 are stored and made available for runtime inference usage. Additional trained model instances 130 may be initialized and stored based on which other trained model instances 130 exist and what anomaly event type 120, model type 122, and feature vector(s) 124 they are associated with.

One of ordinary skill in the art, with the benefit of the present disclosure, would recognize that tuned hyperparameters refer to hyperparameters that have been optimized, set, or selected. The process of hyperparameter selection ("optimization" or "tuning") may refer to the process of finding a combination of hyperparameter values to achieve maximum performance on data. Hyperparameters may be selected ("tuned") using various techniques, such as a manual search, a random search, Bayesian optimization, automated hyperparameter tuning, artificial neural network tuning, gradient based optimization, etc.

The feature generator system 102 may be used to generate one or more feature vectors 124. A feature vector 124 may be an n-dimensional vector of numerical features that describe some object. The feature vector 124 may include various quantitative and/or qualitative features (e.g., attributes) that describe the object. The features may encode and describe various properties of different types of time series using statistical modeling. For example, the generated features may include, but is not limited to: Seasonality based features, Trend based features, Spectral entropy, Lumpiness, Spikiness, Level shift properties, Linearity, Standard deviation, Mean, Harmonic mean, Medium, ARCH statistic, and/or PACF based features.

The feature generator system 102 may be capable of generating the one or more feature vectors 124 by using time series data (e.g., labeled time series data, input time series data, mostly annotated historical time series data, etc.). The features represented by the feature vector 124 may be a function of the time series window length that was input into the feature generator system 102. The time series data may comprise labeled time series data.

The time series data may comprise a plurality of datapoints (e.g., anomaly-indicating training datapoints, datapoints from input time series data). Further, each datapoint in the plurality of datapoints may comprise a time (e.g., at time t2, 2 P.M., 20 seconds, first month, fifth year, etc.) and a value (e.g., access requests, margin, sales, access events, logs, speed, etc.). In certain embodiments (e.g., when using labeled time series data), the datapoints may further comprise a ground truth comprising an anomaly event type 120 label identifying an event type 120 (e.g., a point-wise anomalous event type, a collective anomalous event type, a contextual anomalous event type, or another type of anomalous event) for an event occurring in training data and a model type 122 label identifying a model type 122 (e.g., a one-class SVM model, an isolated forest model, an LSTM model) suited for the anomaly event type 120 identified by the anomaly event type 120 label. The ground truth or ground truth data may refer to what should be considered a correct prediction for given input by a machine learning model training system (e.g., multitask model trainer 106, model instance trainer 114).

As an example, the ground truth may be included in anomaly-indicating training datapoints used by the feature generator system 102 in an offline training environment. Inclusion of anomaly-indicating training datapoints may be capable of training a multitask model 104 to predict a model type 122 and/or an anomaly event type 120 to use for predicting locations of one or more anomalies within time series data. Further, the inclusion of anomaly-indicating training datapoints may be capable of training one or more model instances 130 to predict positions (e.g., at time t2, 2 P.M., 20 seconds, first month, fifth year, etc.) of anomalies within time series data.

In an offline training environment, the multitask model 104 may be trained using a multitask model 104 trainer and feature vectors 124 generated by the feature vector generator. In certain embodiments, the labeled time series data is also used by the multitask model 104 and/or a multitask model 104 trainer.

The multitask model 104 may be trained to be capable of predicting what model type 122 and anomaly event type 120 correspond to a feature vector 124 and/or labeled time series data. The multitask model 104 may have one or more task specific layers and/or include one or more shared layers.

A baseline multitask model 104 may be an untrained multitask model 104 or be a multitask model 104 that has undergone some amount of prior training. In certain embodiments, a baseline multitask model 104 will be considered the baseline multitask model 104 until the accuracy of the predictions generated using the multitask model 104 reach a predefined threshold value that indicates the multitask model 104 is trained enough and has hyperparameters 132 tuned enough for the model to be used with sufficient reliability in a runtime environment as a trained multitask model 104.

Training of the multitask model 104 may comprise predicting a first plurality of training predictions using the baseline multitask model 104, the first plurality of training predictions comprising a first training prediction identifying an anomaly event type 120 present in the input time series data, and a second training prediction identifying a model type 122 to be used for the anomaly event type 120 identified in the first training prediction. Based on a comparison between the ground truth associated with the labeled time series dataset used for training and the first plurality of training predictions, the multitask model 104 parameters associated with the baseline multitask model 104 may be updated by the multitask model trainer 106. For example, the comparison may compare whether the ground truth value(s) match the value(s) of the training predictions. Updating the multitask model 104 parameters associated with the baseline multitask model 104 may be performed in attempt to and/or cause the baseline multitask model 104 to perform subsequent predictions with increased accuracy.

The multitask model trainer 106 may be used to train the multitask model 104. In certain embodiments, the multitask model trainer 106 may also use the labeled time series data when training the multitask model 104. The multitask model trainer 106 may be capable of feeding input and/or receiving output to/from the multitask model 104 to facilitate the training of the multitask model 104.

In certain embodiments, the multitask model trainer 106 feeds labeled time series data into the multitask model 104 so that the multitask model 104 may produce output to then be compared with the output predictions from the multitask model 104. In certain embodiments, the multitask model trainer 106 adjusts hyperparameters 132 of the multitask model 104 based on the output predictions from the multitask model 104. In certain embodiments, the multitask model 104 uses the feature vector 124 to produce an output prediction of a model type 122 and/or anomaly event type 120 and then the multitask model trainer 106 compares the output prediction with ground truth data included in the corresponding labeled time series data (e.g., checking if the ground truth matches the output prediction), which may then cause hyperparameters 132 of the multitask model 104 to be adjusted by the multitask model trainer 106.

A model management system 108 may be used in an offline training environment to instantiate and/or train model instances 130 of a model type 122 for detecting anomalies of an anomaly event type 120. The model management system 108 may comprise a hyperparameter tuner 110, a model instance selector system 112, and/or a model instance trainer 114.

The model management system 108 may receive the feature vector 124, the model type 122, and the anomaly event type 120. The combination of the feature vector 124, the model type 122, and the anomaly event type 120 may be referred to as mapping data 118 because it can be used to map the feature vector 124, the model type 122, and the anomaly event type 120 to a mapping identifier 126 in the event catalog 116.

In certain embodiments, the feature vector 124 is received from the multitask model 104, the multitask model trainer 106, or the feature generator system 102. The feature vector 124 may relate to the same time series data that was used to obtain the model type 122 and the anomaly event type 120 predicted by the multitask model 104.

The model type 122 and the anomaly event type 120 may be received from the multitask model 104 once the multitask model 104 has made a prediction for the model type 122 and the anomaly event type 120 using the feature vector 124 and/or the labeled time series data.

Using the received feature vector 124, model type 122, and anomaly event type 120, the model management system 108 may be capable of transmitting the received feature vector 124, model type 122, and anomaly event type 120 to the event catalog 116 to perform a lookup. In certain embodiments, the feature vector 124, model type 122, and anomaly event type 120 are transmitted directly from the feature generator system 102 and the multitask model 104 prediction output to the event catalog 116, without needing to first be relayed through the model management system 108.

The event catalog 116 comprises mapping data 118 and a mapping identifier 126 that is associated with the mapping data 118. The mapping data 118 may comprise the anomaly event type 120, the model type 122, and one or more feature vectors 124. Thus, the event catalog 116 may be capable of associating the anomaly event type 120, the model type 122, and one or more feature vectors 124 with a mapping identifier 126. The mapping identifier 126 may be used to associate the mapping data 118 with a model instance 130 and model instance hyperparameters 132 stored in a model catalog 128.

Referring briefly to FIG. 2 with a simplified block diagram 200, block diagram 200 is a simplified illustration of information included within an event catalog 116 and a model catalog 128, according to an exemplary embodiment. block diagram 200 further describes the contents and relationship between entries, and contents thereof, of the event catalog 116 and the model catalog 128. The relationship between the entries in the model catalog 128 and event catalog 116 allows for the model instances 130 to be instantiated, trained, and/or used to perform predictions.

As described above, each entry of the event catalog 116 may comprise mapping data 118 and a mapping identifier 126 for each entry of mapping data 118. The mapping data 118 may comprise an anomaly event type 120, a model type 122, and one or more feature vectors 124. Each entry of the model catalog 128 may comprise a mapping identifier 126, a model instance 130, and model instance hyperparameters 132 (e.g., hyperparameter-value pair).

block diagram 200 shows an event catalog 116 that may include any number of entries. A first entry of the event catalog 116 comprises an event type one 120a, a model type one 122a, a feature vector one 124a, and a mapping identifier one 126a. The combination of the event type one 120a, the model type one 122a, and the feature vector one 124a corresponds to mapping identifier one 126a. Thus, if the event catalog 116 was to receive input of a received event type 120, a received model type 122, and a received feature vector 124 that are determined to be similar to the event type one 120a, the model type one 122a, and the feature vector one 124a, then the mapping identifier one 126a would be returned from the event catalog 116 and be capable of being used to look up a corresponding model instance one 130a and model instance hyperparameters 132 one in the model catalog 128.

Thus, an entry of the event catalog 116 is capable of corresponding to an entry of the model catalog 128. The model catalog 128 may include any number of entries. Further, in certain embodiments, more than one entry of the event catalog 116 is capable of corresponding to a single entry of the model catalog 128 (e.g., mapping identifier one 126a of the model catalog 128 corresponds to two entries in the event catalog 116). Such a scenario may occur when the mapping data 118 of two event catalog 116 entries signal that the corresponding input time series may have anomalies accurately determined using the same model instance 130 and model instance hyperparameters 132. Thus, in some cases, the same trained model instance 130 and tuned model instance hyperparameters 132 may allow for an anomaly to be accurately identified even if the feature vectors 124 of two input time series are not the same or similar.

When determining whether to add a new entry to the model catalog 128, the labeled time series data may be used to determine which model instance 130 and model instance hyperparameters 132 correspond to the determined mapping identifier 126 (e.g., using to the datapoint label(s)). In certain embodiments, whenever a new entry is created in the event catalog 116, a new entry is created in the model catalog 128.

New entries in the event catalog 116 may be created if there are no entries within the event catalog 116 or if no existing entries in the event catalog 116 are similar enough to the received feature vector 124, model type 122, and anomaly event type 120. If there are no entries in the event catalog 116, then a new entry will be created once an associated feature vector 124, model type 122, and anomaly event type 120 are received. Upon a new entry being created in the event catalog 116, the entry will include the received feature vector 124, model type 122, and anomaly event type 120 information, and the information will be associated with a new mapping identifier 126. The new mapping identifier 126 will then be associated with a new model instance 130 instantiation and new model instance hyperparameters 132 in a model catalog 128 and will begin to be trained.

The new mapping identifier 126 may be generated based on the data within the entry, existing mapping identifiers 126, an index, and/or a function (e.g., hash of the feature vector 124). The new mapping identifier 126 may be unique among the other mapping identifiers 126 in the event catalog 116.

If one or more entries already exist in the event catalog 116 when a feature vector 124, model type 122, and anomaly event type 120 are received by the event catalog 116, then a comparison may be performed to determine whether the received feature vector 124, model type 122, and anomaly event type 120 are similar to any entries already within the event catalog 116. In certain embodiments, the feature vector 124, model type 122, and anomaly event type 120 may be deemed to be similar to a first existing entry if the received model type 122 matches a first existing model type 122, if the received anomaly event type 120 matches a first existing anomaly event type 120, and the received feature vector 124 is similar to an existing first feature vector 124. A received feature vector 124 may be determined to be similar to a first existing feature vector 124 if their cosine similarity or Euclidean distance is within a predefined threshold, for example. In certain embodiments, only a portion of the mapping data 118 existing in the event catalog 116 is compared to the received model type 122, received anomaly event type 120, and received feature vector 124.

In the case that the received feature vector 124 is determined not to be similar enough to a first existing feature vector 124, then a new entry may be made in the event catalog 116 for the received feature vector 124, model type 122, and anomaly event type 120 and the new entry will be associated with a new mapping identifier 126. Accordingly, a new model instance 130 may be instantiated and begin to be trained. If a new model instance 130 is instantiated, the new model instance 130 may then be stored in the model catalog 128, as will be discussed in more detail below.

In the case that the received feature vector 124 is determined to be similar to a first existing feature vector 124, then an existing entry in the event catalog 116 may be modified to include information regarding at least one of the received feature vector 124, model type 122, and anomaly event type 120. In certain embodiments, the anomaly event type 120 associated with an entry of mapping data 118 may include one or more anomaly event types 120.

In certain embodiments, the feature vector(s) 124 associated with an entry of mapping data 118 may comprise one or more feature vectors. In certain embodiments, the mapping data 118 of an entry may include a single feature vector 124 and the feature vector 124 may be the most recently received feature vector 124 associated with the entry, first received feature vector 124 associated with the entry, a combination of received feature vectors 124 associated with the entry (e.g., a new feature vector 124 between a first feature vector 124 and a second feature vector 124 determined to be similar for the entry), a list of more than one feature vector 124, etc.

Referring back to block diagram 100 in FIG. 1, the model management system 108 may be capable of updating (creating new entries and/or updating existing entries) the event catalog 116 and model catalog 128.

The model management system 108 may be capable of sending to the event catalog 116, the received feature vector 124, model type 122, and anomaly event type 120 to obtain the corresponding mapping identifier 126, the mapping identifier 126 mapping to a model instance 130 and a set of model instance hyperparameters 132 in the model catalog 128. For example, the model instance selector system 112 may be configured to communicate with the event catalog 116 to obtain the mapping identifier 126 and then use the mapping identifier 126 in communication with the model catalog 128 to obtain a model instance 130 and a set of model instance hyperparameters 132. The model instance 130 may then be trained by the model instance trainer 114 and model instance hyperparameter tuner 110 to perform tuning of the set of model instance hyperparameters 132. The set of model instance hyperparameters 132 refers to hyperparameters and their associated values. The associated value for a hyperparameter may be categorical or numerical (e.g., a decimal number).

The model instance trainer 114 and hyperparameter tuner 110 may use the feature vector 124 to train the model instance 130 and tune the hyperparameters 132. In certain embodiments, the labeled time series data is additionally, or alternatively, used by the model instance trainer 114 and hyperparameter tuner 110 to train the model instance 130 and tune the hyperparameters 132 (e.g., adjust and/or select tuned values of the hyperparameters 132).

After the model instance hyperparameters 132 are tuned, the model instance 130 and model instance hyperparameters 132 may be more accurate compared to how they were previously configured. The tuned model instance hyperparameters 132 and model instance 130 can then be stored in the model catalog 128 and associated with the corresponding mapping identifier 126 (e.g., the mapping identifier 126 selected from the event catalog 116 using the associated mapping data 118 (anomaly event type 120, model type 122, and feature vector(s) 124)). Through such a system of offline training, the mapping identifier 126 associated with an anomaly event type 120, model type 122, and feature vectors 124 may be obtained and used to obtain (select an existing model instance 130 or instantiate a new model instance 130) a model instance 130 and train the model instance 130 by tuning model instance hyperparameters 132 associated with the model instance 130.

Some examples, using the illustration of block diagram 200, illustrate how the event catalog 116 and model catalog 128 may be used and are detailed below.

The following is an example of how the event catalog 116 and model catalog 128 may be used if the event catalog 116 does not contain any entries when mapping data 118 is received.

Mapping data 118 (e.g., a feature vector one 124*a*, a model type one 122*a*, and an anomaly event type one 120*a*) may be received by the event catalog 116. In the case that the event catalog 116 is empty, a new entry in the model catalog 128 may be created by the model management system 108 performing a catalog adjustment. The new entry may include the event type one 120*a*, the model type one 122*a*, and the feature vector one 124*a*. Further, a mapping identifier one 126*a* may be generated for the new entry in the event catalog 116. The mapping identifier one 126*a* may then be used to associate the mapping data 118 to an entry in the model catalog 128 that comprises the mapping identifier 126, a model instance 130, and model instance hyperparameters 132. The mapping identifier one 126*a* may be transmitted to the model catalog 128 (e.g., by a model management system 108 (e.g., by a model instance selector system 112)). The mapping identifier one 126*a* may then be compared to mapping identifiers already stored in the model catalog 128 (e.g., using a hashmap) to determine if the model catalog 128 comprises an entry with a matching mapping identifier 126. In the case that the model catalog 128 does not yet include an entry with the mapping identifier one 126*a*, then a new model instance one 130*a* and model instance hyperparameters one 132*a* may be instantiated and trained using the feature vector 124 (e.g., feature vector one 124*a*) and/or corresponding labeled time series data. The model instance one 130*a* and model instance hyperparameters one 132*a* may be trained and tuned by the model management system 108 (e.g., hyperparameter tuner 110, model instance trainer 114) to predict anomalies within time series data. After the model instance one 130*a* and model instance hyperparameters one 132*a* are trained and tuned using the labeled time series data, the trained and tuned model instance one 130*a* and model instance hyperparameters one 132*a* may be stored in the model catalog 128 and associated with the mapping identifier one 126*a* that was identified by the event catalog 116.

Subsequently, the trained and tuned model instance one 130*a* and model instance hyperparameters one 132*a* may be obtained from the model catalog 128 and further trained and tuned, and/or the model instance one 130*a* and model instance hyperparameters one 132*a* may be obtained from the model catalog 128 during runtime and used for generating predictions of anomalous datapoints when a corresponding mapping identifier 126 is obtained using mapping data 118 received by the event catalog 116.

The following is an example of how the event catalog 116 and model catalog 128 may be used if the event catalog 116 contains entries when mapping data 118 is received.

Mapping data 118 (e.g., a feature vector two 124*b*, a model type two 122*b*, and an anomaly event type one 120*a*) may be received by the event catalog 116. In the case that the event catalog 116 has at least one entry, the received mapping data 118 may be compared with mapping data 118 included within existing entries in the event catalog 116. One having ordinary skill in the art with the benefit of the present disclosure would recognize various ways in which the existing mapping could be compared and/or the fields (e.g., anomaly event type 120, model type 122, feature vector(s) 124) of the existing mapping data 118 could be compared with received mapping data 118.

If the mapping data 118 is determined to be similar to an existing entry within the event catalog 116, then the mapping data 118 may be associated with the same mapping identifier 126. For example, if the mapping data 118 comprises the same event type 120 (e.g., event type one 120a), the same model type 122 (e.g., model type one 122a), and same or similar feature vector 124 (e.g., comparing feature vector one 124a and feature vector two 124b using a cosine similarity metric) as existing mapping data 118 of an existing entry in the event catalog 116, then the mapping data 118 may then be associated with the existing entry within the event catalog 116 and thereby be associated with the same existing mapping identifier 126. In the illustration shown, as an example, feature vector two 124b may not be similar enough to feature vector one 124a and therefore causes a new entry in the event catalog 116 to be created.

As an example, feature vector four 124d may have been determined to be within a similarity threshold of feature vector three 124c and had been associated with the same model type three 122c and event type one 120a as feature vector three 124c, therefore resulting in feature vector four 124d being added to the same entry that feature vector three 124c was already included within. As a result, feature vector four 124d may correspond to mapping identifier 126 (e.g., mapping identifier one 126a) as feature vector three 124c.

If mapping data 118 has been associated with an existing mapping identifier 126 in the event catalog 116, then the mapping identifier 126 may then be used to retrieve the model instance 130 and model instance hyperparameters 132 from the model catalog 128. For example, once feature vector four 124d has been determined to be similar to feature vector three 124c, mapping identifier one 126a may be returned from the event catalog 116 and used with the model catalog 128 to determine the corresponding model instance one 130a and model instance hyperparameters one 132a which have already begun to be trained using labeled time series data associated with feature vector one 124a and feature vector three 124c. The model instance one 130a and model instance hyperparameters one 132a may become further trained using the labeled time series data associated with feature vector four 124d. The model instance one 130a and model instance hyperparameters one 132a may be trained further upon receipt of more mapping data 118 to the event catalog 116, upon using feedback during runtime, and/or be used to generate predictions during runtime in the runtime environment.

If the mapping data 118 is determined to not be similar to an existing entry within the event catalog 116, then a new entry may be created, for example, like the entry comprising event type one 120a, model type two 122b, and feature vector two 124b that corresponds to mapping identifier two 126b. In certain embodiments, the mapping data 118 in the event catalog 116 that corresponds to mapping identifier two 126b may have been determined to not be within a similarity threshold to any other mapping data 118 within the event catalog 116 and therefore a new entry within the event catalog 116 was created comprising the mapping data 118 (event type one 120a, model type two 122b, and feature vector two 124b) and mapping identifier two 126b.

Additionally, it is illustrated that in certain embodiments, an entry of the event catalog 116 may include more than one anomaly event type 120. For example, mapping identifier four 126d in the event catalog 116 corresponds to mapping data 118 comprising feature vector six 124f, model type one 122a, event type one 120a, and event type two 120b. In such embodiments, the multitask model may have determined that two anomaly event types 120 correspond to the data-points input to the multitask model. For example, input time series data may include more than one anomaly event type 120 in one case. In another example, two input time series may each have one anomaly event type 120, but may be determined to be accurately detectable using the same model type one 122a and therefore map to the same mapping identifier four 126d.

Offline Training Flow

FIG. 3 is a simplified flow diagram 300 for training, according to an exemplary embodiment. During offline training, the multitask model and/or model instances within the model catalog may be trained. Training model instances may comprise instantiating a model instance and then training the model instance. Training model instances may comprise obtaining an instantiated model instance and then training the model instance. During training of a model instance, the model catalog and event catalog may be adjusted.

At 302, a training dataset is received. The training dataset may comprise one or more time series and ground truth data for each time series. For example, the training dataset may comprise a plurality of anomaly-indicating training data-points where each anomaly-indicating training datapoint comprises a time, a value, and a ground truth. The ground truth may comprise an anomaly event type label identifying an event type (e.g., a contextual anomaly) for an event occurring in the training data and a model type label identifying a model type (e.g., an isolated forest model) suited for the anomaly event type identified by the anomaly event type label. The training dataset may then be used subsequently to train a multitask model and/or one or more model instances.

At 304, 306-318 are performed for each time series in the training dataset, the time series having a corresponding ground truth data. Processing performed in 306-318 may at least train the multitask model, a model instance, configure an event catalog, and configure a model catalog.

At 306, a feature vector is generated using the received time series. The feature vector may encode a set of features of the received time series.

At 308, a multitask model may be trained. The multitask model may be trained using the feature vector and the training dataset. The multitask model may be trained to predict: (i) one or more anomalies in the time series, (ii) for each anomaly, an anomaly event type, and (iii) for each anomaly, a model type best suited for predicting the anomaly point(s). During training of the multitask model, the hyper-parameters of the multitask model may be updated based upon the result of the predicted anomaly event type(s) and/or the predicted model type(s) being compared with the corresponding ground truth data.

At 310, a model instance may be obtained. Obtaining a model instance may comprise instantiating a model instance and/or retrieving an instantiated model instance. The model instance may be obtained by using the feature vector. In certain embodiments, the model instance may be obtained based on a stored feature vector associated with a stored event type and a stored model type being compared with a generated feature vector associated with a predicted anomaly event type and predicted model type obtained from the multitask model in 308. In certain embodiments, the comparison may determine if the stored feature vector, stored event type, and stored model type are determined to be similar to the generated feature vector, the predicted anomaly event type and the predicted model type, respectively.

At 312, the model instance is trained to accurately predict the anomalies present in the time series as indicated by the ground truth data of the training dataset.

At 314, hyperparameter tuning for the model instance is performed to generate a tuned set of hyperparameters and associated values. The tuned set of hyperparameters may be capable of accurately predicting the anomalies present in the time series as indicated by the ground truth data of the training dataset.

At 316, the trained model instance and its set of tuned hyperparameters (the tuned set of hyperparameters and associated values generated from 314) are stored in a model catalog. As already described in more detail above, the model catalog may store any number of trained model instances and associated set of hyperparameters. The stored trained model instance and its set of tuned hyperparameters may be associated with a mapping identifier in the model catalog.

At 318, an events catalog may be updated. The events catalog may be updated with adjusted mapping data and/or mapping identifier information. The mapping data may comprise the feature vector generated in 306, and the event type and model type predicted in 308. The mapping identifier information may be used to identify the trained model instance and its set of hyperparameters in the model catalog.

Further details of how the event catalog and model catalog may be searched and/or updated is discussed with regard to FIGS. 2 and 4.

At 320, the trained multitask model, event catalog, and/or model catalog may be made available for runtime inferencing (e.g., made available to a runtime environment). In certain embodiments, the runtime environment may already have a runtime multitask model, a runtime event catalog, and/or a model catalog that is capable of using or has been used to perform predictions in the runtime environment. In certain embodiments, the trained multitask model, event catalog, and/or model catalog may be made available for runtime inferencing after a period of time has passed, once predictions have become more accurate, upon request of the runtime environment, etc.

The processing depicted in flow diagram 300, and any other FIGS. may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in flow diagram 300, and other FIGS. and described herein are intended to be illustrative and non-limiting. Although flow diagram 300, and other FIGS., depicts the various processing steps occurring in a particular sequence or order, this is not intended to be limiting. In certain alternative embodiments, the processing may be performed in some different order or some steps may also be performed in parallel. It should be appreciated that in alternative embodiments the processing depicted in flow diagram 300, and other FIGS., may include a greater number or a lesser number of steps than those depicted in the respective FIGS.

A. Flow of Updating Catalogs

FIG. 4 is a simplified flow diagram 400 for updating an event catalog and/or a model catalog, according to an exemplary embodiment.

At 402, mapping data including an anomaly event type, a model type, and a feature vector may be received. In certain embodiments, the mapping data is received from a model management system. In certain embodiments, some of the mapping data is received from the model management system and some may be received from another system (e.g., a feature vector generator). In certain embodiments the mapping data is received by an event catalog.

At 404, a determination may be made as to whether any existing mapping data in the event catalog is similar to the received mapping data. Similarity has been discussed above. For example, similarity may be determined using an entire entry of the event catalog, or comparisons of one or more fields in the entry of the event catalog (e.g., feature vector(s), model type, anomaly event type) within an entry.

In certain embodiments, the feature vector, model type, and anomaly event type may be deemed to be similar to an existing entry if the received model type matches an existing model type, if the received anomaly event type matches an existing anomaly event type, and the received feature vector is similar to an existing first feature vector. A received feature vector may be determined to be similar to a first existing feature vector if their cosine similarity or Euclidean distance is within a predefined threshold, for example.

In certain embodiments, if the received model type and an existing model type do not match, then the mapping data cannot be similar. In certain embodiments, if the received event type and an existing event type do not match, then the mapping data cannot be similar.

One of ordinary skill in the art with the benefit of the present disclosure would recognize various ways that the received mapping data may be compared to the existing mapping data to determine if the compared mapping data should be determined as being similar.

At 406, a check is made to see if during 404 it was determined that any mapping data in the event catalog is similar to the received mapping data (e.g., the received anomaly event type, the model type, and the feature vector). The process performed at 406 directs the process flow in one of two directions as a result of the similarity determination made in 404. If existing mapping data in the event catalog is determined to be similar to the received mapping data, then the process flow continues onto 414. On the other hand, if existing mapping data in the event catalog is determined to not be similar to the received mapping data, then the process flow continues onto 408.

Processing at 408 is performed if existing mapping data in the event catalog is determined to not be similar to the received mapping data. At 408, a new entry is created in the event catalog and will comprise the received mapping data (the received model type, the received event type, and the received feature vector). The new entry may further comprise a new mapping identifier that is associated with the received mapping data. As a result, mapping data the model catalog subsequently receives that is deemed to be similar to the received mapping data that is has been stored in the event catalog may be capable of also being associated with the new mapping identifier.

At 410, anew model instance is trained and new model instance hyperparameters are tuned for the model instance. The new model instance and the new model instance hyperparameters will be trained and tuned based on time series data (e.g., labeled time series data) that corresponds to the received mapping data.

At 412, a model catalog may be updated with the new model instance, the new model instance hyperparameters, and the mapping identifier. In certain embodiments, if the mapping identifier is not associated with an entry in the model catalog, then a new entry will be created for the mapping identifier (e.g., the new mapping identifier) and the mapping identifier will be associated with the new model instance and the new model instance hyperparameters.

Subsequent to the new entry being created with the new mapping identifier, the mapping identifier may be used to retrieve information (e.g., the new model instance and the new model instance hyperparameters) associated with the new entry. Such information may be retrieved for making runtime predictions, for training the model instance and tuning the model instance hyperparameters during runtime, and/or for training the model instance and tuning the model instance hyperparameters during subsequent offline training.

Processing at 414 is performed if existing mapping data in the event catalog is determined to be similar to the received mapping data. If existing mapping data in the event catalog is determined to be similar to the received mapping data, then the feature vector field of the existing mapping data in the event catalog may be updated using the received feature vector at 414 (e.g., adding the received feature vector to a list of feature vectors in the field). For example, if the received feature vector was determined to be similar to an existing feature vector in the event catalog during 404, then the received feature vector may also be associated with the existing feature vector, associated mapping data, and associated mapping identifier. Thus, in certain embodiments, the received feature vector is added to the existing mapping data entry in the event catalog so that subsequently received feature vectors that are similar to the existing feature vector and/or the received feature vector may then also be determined to be similar to the mapping data and be associated with the mapping identifier. In certain embodiments, even if the received feature vector is similar to an existing feature vector, the mapping data for the entry associated with the existing feature vector is not updated.

At 416, an existing mapping identifier corresponding with the existing mapping data may be retrieved from the event catalog. Further, the existing mapping identifier may allow for the model catalog to determine an existing model instance and existing model instance hyperparameters corresponding to the existing mapping identifier. The existing model instance and existing model instance hyperparameters corresponding to the existing mapping identifier may then be selected for further training and hyperparameter tuning. Subsequently, the selected existing model instance and existing model instance hyperparameters may be trained and tuned according to training performed using time series data (e.g., labeled time series data) corresponding to the received mapping data, thereby generating an updated model instance and/or an updated model instance hyperparameters At 418, the model catalog may be updated with the updated model instance and/or the updated model instance hyperparameters that have been further trained and/or tuned. The updated model instance and/or the updated model instance hyperparameters may be associated with the mapping identifier identified in 414.

Runtime

A runtime environment may comprise a multitask model and one or more model instances trained during a training phase (e.g., in an offline environment). A runtime environment may further comprise an event catalog and a model catalog that was populated with one or more entries during a training phase (e.g., in an offline environment).

The trained multitask model may be used to predict, using input time series data, an anomaly event type present in the input time series data and a model type to be used for the anomaly event type identified in the first prediction. Using the predicted anomaly event type, the predicted model type, and/or a feature vector of the input time series data, a trained model instance may be selected from a plurality of trained model instances. Additionally, the selected trained model instance may have an associated set of selected tuned hyperparameter values for a set of hyperparameters which may be referred to as model instance hyperparameters. The trained model instance and associated set of selected tuned hyperparameter values for a set of hyperparameters may then be used to predict an anomaly event in the input time series data, and output information indicative of the predicted anomaly event.

Further details of such systems and processes are described below.

B. Selecting a Model Instance

Figure 5:
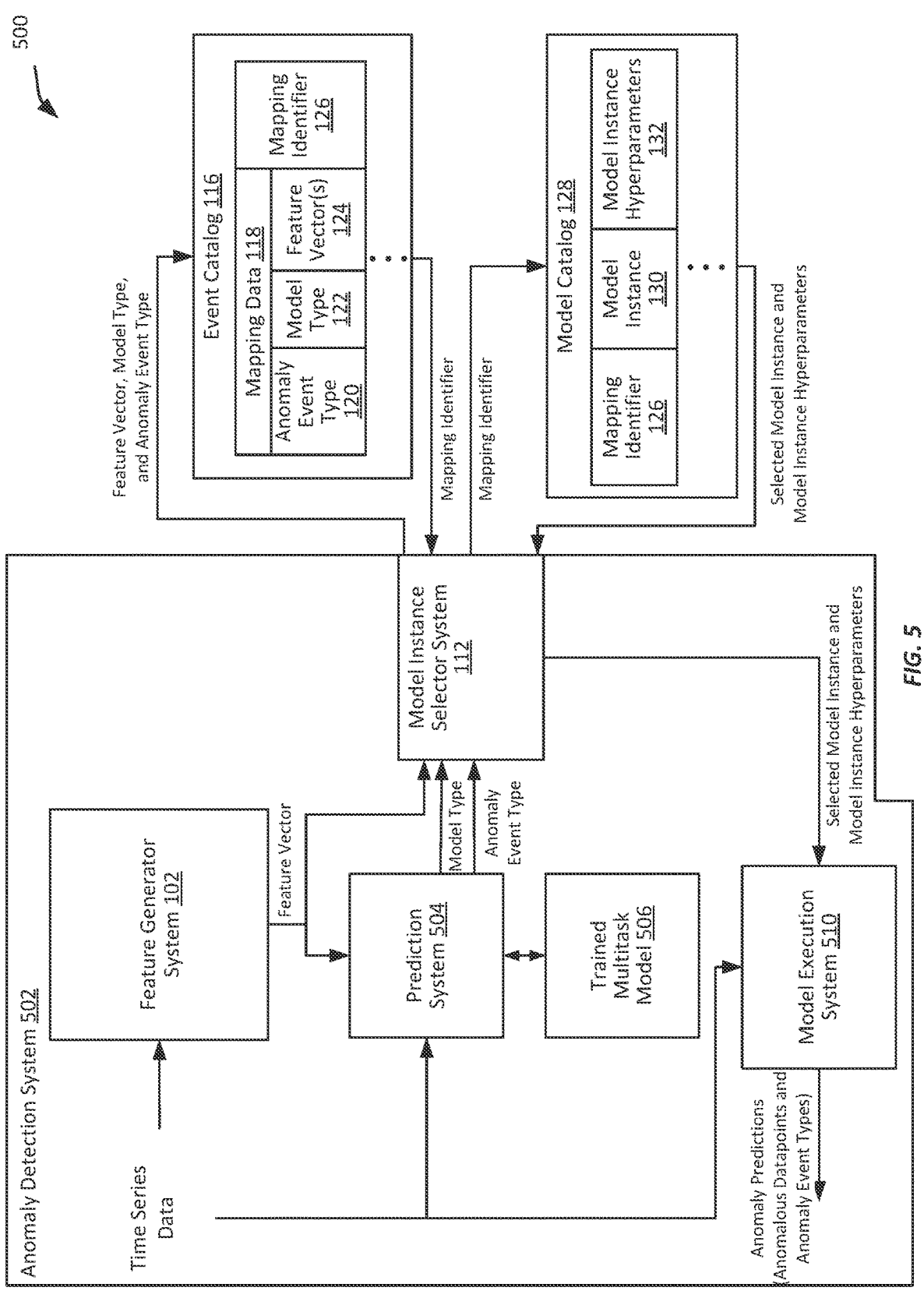
FIG. 5 is a simplified block diagram of a portion of a runtime environment, according to an exemplary embodiment.

FIG. 5 is a simplified block diagram 500 of a portion of a runtime environment, according to an exemplary embodiment.

The runtime environment may comprise an anomaly detection system. The anomaly detection system may be capable of receiving time series data comprising a plurality of datapoints and outputting anomaly predictions (e.g., anomaly datapoints (e.g., position of an anomaly) and anomaly event types 120). The anomaly detection system may be capable of sending information to and receiving information from an event catalog 116 and/or a model catalog 128.

The anomaly detection system may comprise a feature generator system 102. The feature generator system 102 may behave in a similar way to the feature generator system 102 described with respect to block diagram 100 to generate a feature vector 124 that corresponds to the time series data used by the feature generator system 102.

The anomaly detection system may further comprise a prediction system 504. The prediction system 504 may be capable of interfacing with a trained multitask model. The trained multitask model may be a multitask model that was trained by the systems and processes described above (e.g., in an offline training environment). The prediction system 504 may be capable of using the time series data (e.g., via a feature vector 124 generated from the time series data, the time series data) and the trained multitask model to generate predictions. The predictions generated by the prediction system 504 may be a model type 122 prediction and/or an anomaly event type 120 prediction. The prediction system 504 may then transmit the model type 122 prediction and/or the anomaly event type 120 prediction to the model instance selector system 112.

The model instance selector system 112 may be capable of using the feature vector 124 (e.g., received from the feature generator system 102), the model type 122 prediction, and the anomaly event type 120 prediction to determine which model instance 130 and model instance hyperparameters 132 should be used by a model execution system 510. The model selector system may be capable of selecting, from a plurality of trained model instances 130, a trained model instance 130, the trained model instance 130 having an associated set of model instance hyperparameters 132 comprising tuned hyperparameter values for a set of selected hyperparameters.

For example, the model instance selector system 112 may receive mapping data 118 comprising a first prediction identifying an anomaly event type 120 present in input time series data, a second prediction identifying a model type 122 to be used for the anomaly event type 120 identified in the first prediction, and a feature vector 124 generated by the feature generator system 102 using the input time series data. The model instance selector system 112 may then use the received mapping data 118 (e.g., the first prediction, second prediction, and feature vector 124) to determine a mapping identifier 126 in an event catalog 116. The mapping identifier 126 may be determined by comparing the received mapping data 118 with existing mapping data 118 stored in the event catalog 116 wherein the existing mapping data 118 corresponds to respective mapping identifiers 126. The mapping identifier 126 may then be used by the model instance selector system 112 to select a first trained model instance 130 and a set of first trained model instance hyperparameters 132 from a model catalog 128. The model instance selector system 112 may then transmit the selected first trained model instance 130 and the set of first trained model instance hyperparameters 132 to the model execution system 510 for an anomaly prediction to be generated.

In certain embodiments, the model instance 130 may be a one-class SVM model, an isolated forest model, an LSTM-based model, or another machine learning model capable of identifying one or more anomalous datapoints from input time series data.

In certain embodiments, when no existing mapping data 118 in the event catalog 116 is determined to be within a similarity threshold to the received mapping data 118, then the model instance selector system 112 will not receive a mapping identifier 126 and/or will not transmit a mapping identifier 126 to the model catalog 128. In certain embodiments, the existing mapping data 118 that is most similar to the received mapping data 118 will be used to select a corresponding mapping identifier 126. In certain embodiments, when no existing mapping data 118 in the event catalog 116 is determined to be within a similarity threshold to the received mapping data 118, then the model instance selector system 112 will receive a default mapping identifier 126.

A. Using a Model Instance

Once the model instance selector system 112 transmits the selected trained model instance 130 and a set of trained model instance hyperparameters 132 to the model execution system 510 for an anomaly prediction to be generated, the model execution system 510 may be capable of predicting an anomaly event in the input time series data. The model execution system 510 may use the trained model instance 130 and the trained model instance hyperparameters 132 received from the model instance selector system 112 along with the input time series data to generate an anomaly prediction. The input time series data may correspond to the mapping data 118 used to obtain the mapping identifier 126 that was used to obtain the trained model instance 130 and the trained model instance hyperparameters 132.

The anomaly prediction may comprise an anomaly event type 120. For example, the anomaly prediction event type may be a point-wise anomalous event type, a collective anomaly event type 120, or a contextual anomaly event type 120. Thus, the anomaly prediction may comprise one or more datapoints from the input time series data.

A point-wise anomaly event type 120 may be identified when a single instance of data is too far off (e.g., data points that deviate from common statistical properties of a distribution, including mean, median, mode, and quantiles) from the rest. As an example, such detection could be useful for detecting credit card fraud based on an amount spent datapoint.

A collective anomaly event type 120 may be identified when a set of data instances collectively helps in detecting an anomaly. As an example, someone may be trying to copy data form a remote machine to a local host unexpectedly, such an anomaly could be flagged as a potential cyber attack.

A contextual anomaly may be context specific. A contextual anomaly event type 120 may be identified when an anomaly occurs while considering the context of the data. As an example, spending $100 on food every day during the holiday season (e.g., one week of November, one week of December) may be normal, but may be odd during other times of the year.

After the anomaly prediction has been generated by the model execution system 510, the anomaly prediction may be transmitted to an annotation system.

Figure 6:
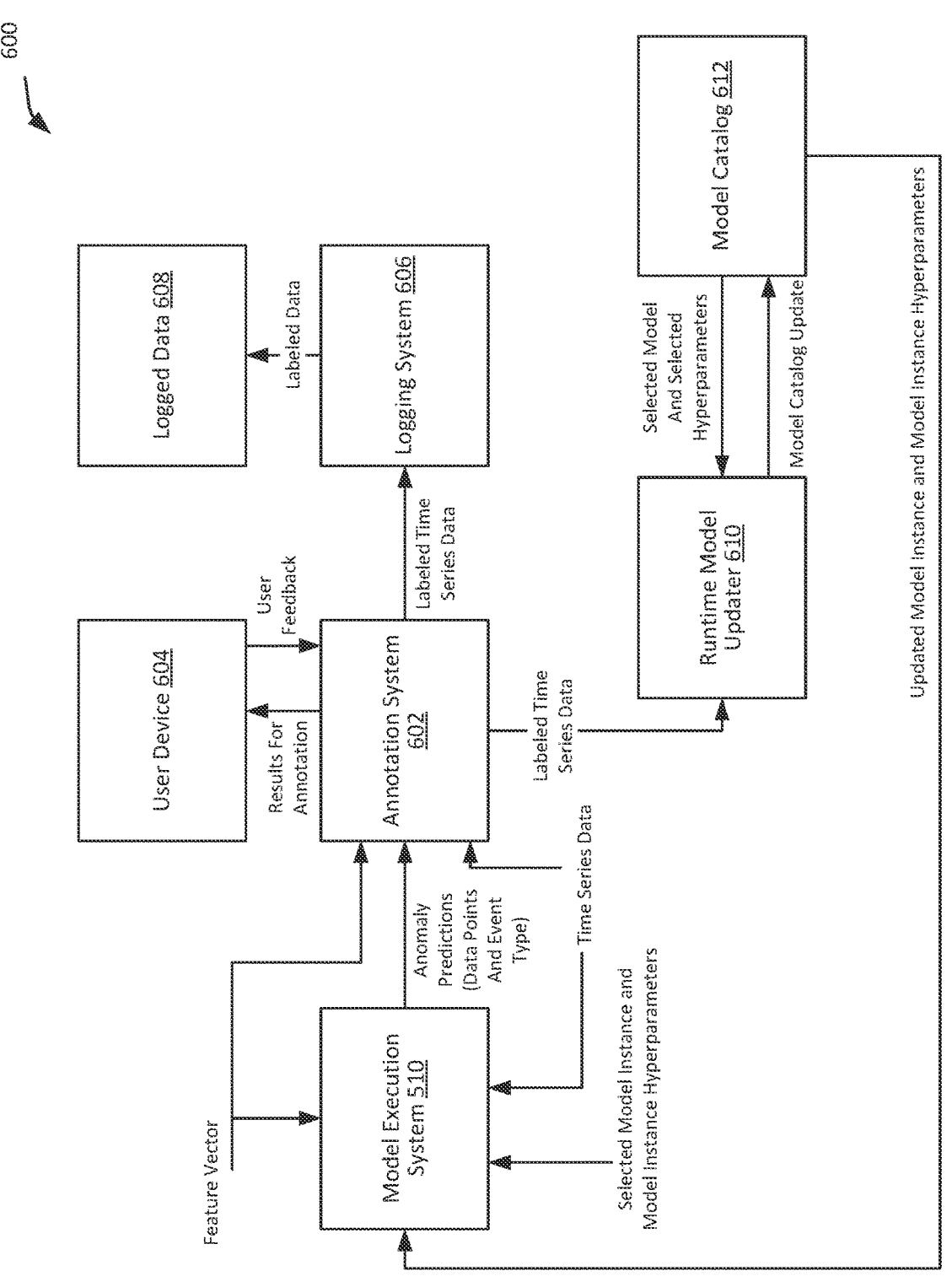
FIG. 6 is a simplified block diagram of a portion of a runtime environment, according to an exemplary embodiment.

FIG. 6 is a simplified block diagram 600 of a portion of a runtime environment, according to an exemplary embodiment. block diagram 600 illustrates how the anomaly prediction generated by the model execution system 510 may be used by an annotation system 602 and what actions may occur after the anomaly prediction has been generated.

The annotation system 602 may be capable of receiving the anomaly prediction(s) (e.g., from the model execution system 510). Further, the annotation system 602 may be capable of receiving the feature vector (e.g., generated by the feature generator system)) and the input time series data. The input time series data may correspond to the generated anomaly prediction (e.g., was used for generating the anomaly prediction).

In certain embodiments, the input time series data includes one or more points, that were not predicted as being anomalies by the model execution system 510.

For example, input time series data may include point one, point two, and point three and the model execution system 510 may have predicted point two to be an anomaly (e.g., a point wise anomaly). Thus, in certain embodiments, the annotation system 602 received one or more data points from the input time series data that are not predicted to be anomalies.

As another example, input time series data may include point one, point two, and point three and the model execution system 510 may have predicted all three points to be anomalous (e.g., a collective anomaly). Thus, in certain embodiments, the annotation system 602 only received points from the input time series data that are predicted to be anomalies.

As another example, the input time series data may include point one, point two, and point three and the model execution system 510 may have predicted point two to be anomalous, but points two and three should have each been identified as anomalous. Thus, in certain embodiments, the annotation system 602 received one or more data points from the input time series data that are not predicted to be anomalies but should have been if the trained model instance and tuned hyperparameters were completely accurate.

The annotation system 602 may be capable of sending results to a user device 604 for annotation. For example, the user device 604 may be a phone, laptop, tablet, desktop, etc.

In certain embodiments, the anomaly predictions for annotation are provided to the user device 604 from the annotation system 602 as a result of the user device 604 sending a request to the annotation system 602 for data to annotate. The user device 604 may send a request for a certain number of datapoint to annotate, certain types of predictions with below a threshold certainty, for points that are expected to be capable of annotating within a set time limit, etc. In certain embodiments, the annotation system 602 may decide without a request from the user device 604 which points should be sent to the user device 604 for annotation. In certain embodiments, points from the same input time series data may be sent to one or more user devices 604. Thus, it is possible that some points from the input time series data are annotated using a first user device 604, and the same and/or other points from the input time series data are annotated using a second user device 604.

A user device 604 may be capable of prompting a user of the user device 604 for the number of datapoints from the input time series they would like to annotate, to enter how much time the user has to annotate, what the user would like to annotate, etc. The user of the user device 604 may be allowed to confirm or deny the accuracy on a point-by-point basis for the input time series data and the corresponding predictions. In certain embodiments, the user can select (e.g., by clicking) any point, set of points, or time window, of a presented input time series and create a label for the point(s). The user may or may not be presented with the predicted label determined by the model execution system 510 for the time series point that the user is labeling.

Further, the user may be able to decide to provide one or more feedback types for the predictions obtained from the annotation system 602. For example, the user may be able to provide feedback on the predicted anomaly (e.g., whether the prediction is correct, what type of anomaly event occurred, etc.), may be able to flag one or more points of the input time series that should be identified as anomalous, and/or the user may be able to adjust the period of seasonality.

Additionally, for each point presented to the user, the user may be allowed to mark the point as an anomaly, not an anomaly, or allow the anomaly to be automatically detected in accordance with the prediction by the model execution system 510.

In certain embodiments, the user of the user device 604 can mark a point of the input time series where a trend has changed, an anomaly including one or more subsequent points begins and/or ends, etc.

In certain embodiments, the user of the user device 604 can provide feedback regarding the period/seasonality of the input time series.

In certain embodiments, the time series data comprises labels generated prior to the anomaly prediction being generated. The user may be allowed to replace the labels in certain embodiments. In certain embodiments, the user may be allowed to add additional labels while maintaining the history of one or more prior labels for the same point of the time series data.

In certain embodiments, when a user annotation is created, an identifier of the user (e.g., a unique ID of the user) may be associated with the annotation. In certain embodiments, when an annotation is created, a timestamp corresponding to when the annotation was created may be associated with the labeled time series data.

Once one or more annotations have been acquired from the user of the user device 604, the annotations (user feedback) may then be combined with the time series data (e.g., previously labeled time series data and/or unlabeled time series data) to generate labeled time series data.

The annotations system may be capable of transmitting the labeled time series data to a logging system 606 and/or to a runtime model updater 610.

1. Logging Labeled Data

The logging system 606 may be capable of receiving the labeled time series data from the annotation system 602 and then logging that data to generate logged data 608. The logged data 608 may comprise the labeled time series data. The logged data 608 may be able to create a repository of labeled time series data. Thus, the logged data 608 may be used by other machine learning models and/or be capable of being used by the systems described herein for further training. Therefore, the logged data 608 may be capable of being used in a training environment (e.g., the offline training environment described with respect to block diagram 100) to train a multitask model and/or one or more model instances, wherein the model instances may then be stored in a model catalog. Accordingly, labeled data from one or more runtime environments may be used to train models in an offline environment so that updated (e.g., more accurate) models may be pushed out to update one or more runtime environments. Therefore, embodiments may allow for a collection of runtime environments performing labeling to improve other runtime environments.

2. Updating Model Instance at Runtime

The runtime model updater 610 may be capable of receiving the labeled time series data and then further training one or more models of the model catalog 612 with the labeled time series data (e.g., by continuing to train the model instance and/or tune the model instance hyperparameters, by restarting training of the model instance and/or tuning of the model instance hyperparameters). Thus, the model catalog 612 may be capable of being updated with a further trained model instance and/or model instance hyperparameters in the runtime environment. Such updates to the model catalog 612 may be capable of increasing the accuracy of predictions made by the further trained model instance and/or model instance hyperparameters compared to the same entry in the model catalog 612 before the model instance and model instance hyperparameters associated with the entry were further trained and/or tuned. Thus, model catalog 612 may comprise entries with further trained model instances and further tuned model instance hyperparameters compared to the model catalog as trained in the offline environment (e.g., model catalog 128 from FIGS. 1 and 2).

The runtime model updater 610 may obtain the entry information from the model catalog 612 associated with the mapping identifier used to obtain the selected model instance and model instance hyperparameters used by the model execution system 510, the entry information comprising the mapping identifier the selected model instance and model instance hyperparameters. The runtime model updater 610 may then perform additional training and hyperparameters tuning for the model instance and model instance hyperparameters. The additional training may use the labeled time series data as ground truth data for the training. In certain embodiments, after obtaining user feedback labels, the model instance will be trained in a semi-supervised mode by using the labels to guide the clustering via constraint-clustering methods.

Once the additional training and/or tuning has been completed using the labeled time series data and the entry information, the entry information associated with the mapping identifier 126 may be updated with an updated trained model instance and updated model instance hyperparameters. The updated entry comprising the updated model instance and updated model instance hyperparameters, still associated with the same mapping identifier, may then be stored in the model catalog 612. The updated entry may be used for subsequent predictions generated by the model execution system 510 (e.g., using input time series data and/or labeled time series data).

In certain embodiments, once an updated entry is stored in the model catalog 612, the model execution system 510 may use the same or different time series data with the updated model instance and updated model instance hyperparameters associated with the entry to generate an anomaly prediction to transmit to the annotation system 602. The annotation system 602 may or may not obtain user feedback on the anomaly predictions and/or time series data, cause labeled time series data to be stored in the logging system 606, and/or update the model catalog 612 using the runtime model updater 610.

Runtime Flow

FIG. 7 is a simplified flow diagram 700 performed by an anomaly detection system, according to an exemplary embodiment. The anomaly detection system may be operated in a runtime environment.

At 702, time series data is received. The anomaly detection system may allow for one or more anomalies within the time series data to be identified.

At 704, features are extracted from the time series data, thereby generating a feature vector 124 of the received time series data.

At 706, the time series data and the feature vector 124 are provided as input to a trained multitask model. The trained multitask model may be capable of predicting a model type and an anomaly event type associated with the time series data.

At 708, using the inputs received from 706, the trained multitask model may generate and output a set of predictions. The set of predictions may include a first prediction of an anomaly event type that is present in the time series data and a second prediction of a model type to be used for predicting an anomaly of the anomaly event type in the time series data.

At 710, the first prediction, second prediction, and feature vector 124 may be used as mapping data to obtain a mapping identifier from an event catalog. The mapping identifier may then be used with a model catalog to select a trained model instance and trained model instance hyperparameters.

At 712, the selected trained model instance and trained model instance hyperparameters may be used to predict one or more anomalies in the received time series data. For example, the received time series data may be used with the trained model instance and the trained model instance hyperparameters to generate a prediction of one or more anomalies within the received time series data.

At 714, the information indicative of the one or more anomalies predicted in 712 may be output. The output may then be used to obtain annotations, to train further prediction systems (e.g., the multitask model used in 706, a model instance from the model catalog referred to in 710, or another model (whether part of the described system or not), to determine an action that should be performed, etc.).

B. Flow of Labeling

As mentioned above, predictions (e.g., 714 in from flow diagram 700, from model execution system 510) may be annotated.

Figure 8:
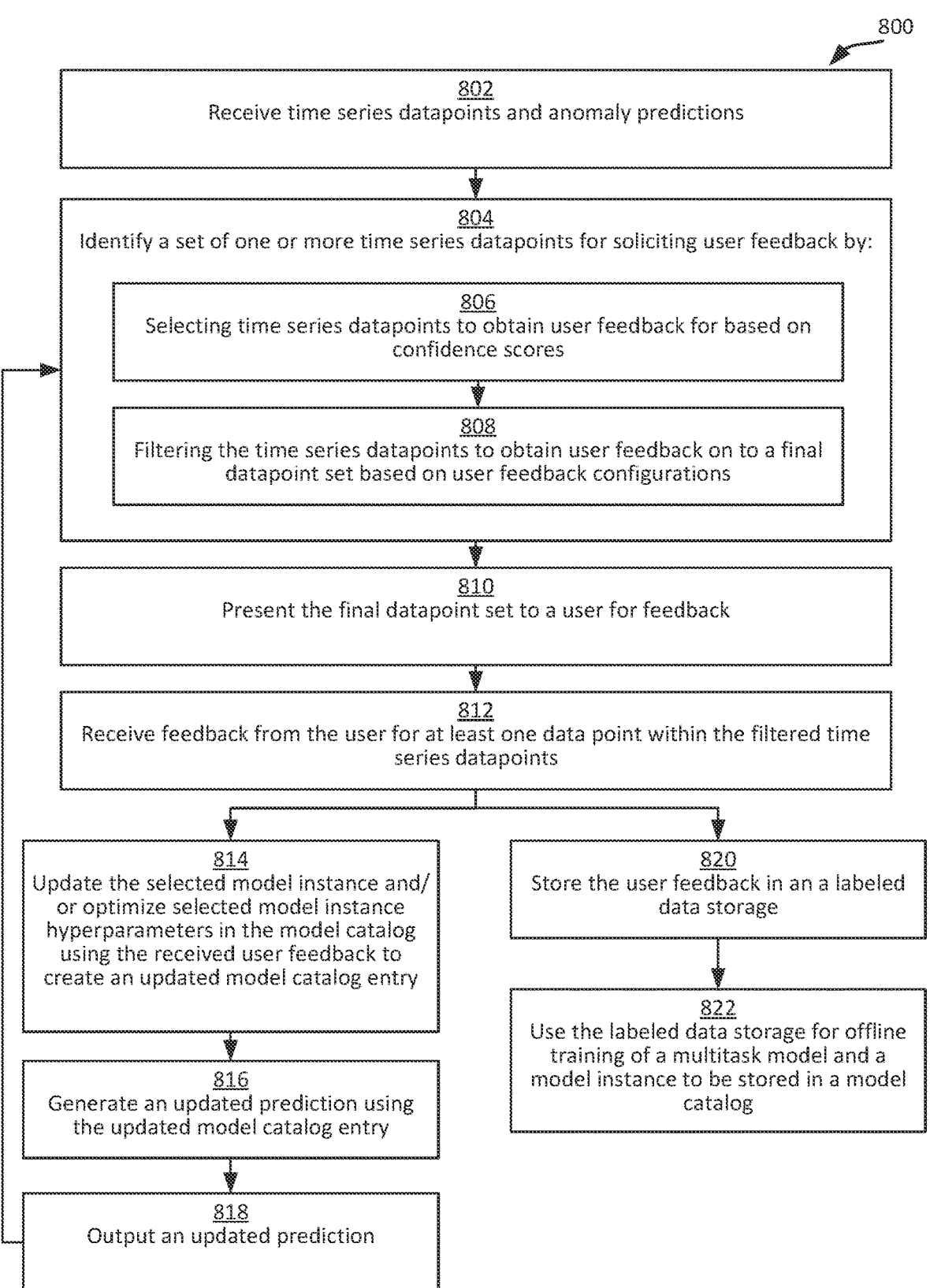
FIG. 8 is a simplified flow diagram for receiving and using user feedback in a runtime environment, according to an exemplary embodiment.

FIG. 8 is a simplified flow diagram 800 for receiving and using user feedback in a runtime environment, according to an exemplary embodiment.

At 802, time series datapoints and anomaly predictions may be received. For example, an annotation system may receive the time series datapoints and anomaly predictions. The anomaly predictions may correspond to one or more time series datapoints that are received. The anomaly predictions may predict for one or more datapoints within the time series, whether the datapoint(s) is/are an anomaly or not, and may further predict the type of anomaly that exists at the respective point(s). One or more of the received time series datapoints may comprise one or more labels that identify the datapoint(s) as having no anomaly or a specific type of anomaly.

At 804, a set of one or more time series datapoints is identified for soliciting user feedback. User feedback may be solicited so that the one or more time series datapoints may be labeled. Each respective label may include information such as whether an anomaly exists at the datapoint, what type of anomaly exists at the datapoint, a user identifier of the user performing the labeling, a timestamp of when the labeling occurred, and/or other information that could be obtained from a user and/or user device performing the labeling.

Processing at 806 and 808 relate to ways in which one or more time series datapoints may be identified for soliciting user feedback, according to certain embodiments.

At 806, time series datapoints are selected to obtain user feedback for based on a confidence score. For example, when an anomaly prediction is made using a model instance from a model catalog, model instance hyperparameters from the model catalog, and time series data, the generated anomaly prediction may further comprise a confidence score relating to the confidence level of the prediction (e.g., the prediction made by the model instance, the confidence of the multitask model predictions) that was made. In certain embodiments, selecting time series datapoints to obtain user feedback on may be done randomly.

At 808, the time series datapoints to obtain user feedback on may be filtered to a final datapoint set according to user feedback configurations. For example, the user feedback configurations may identify a threshold confidence score. The threshold confidence score may determine the final datapoint set to obtain user feedback for (e.g., predictions corresponding to time series datapoints with a confidence score below a threshold may obtain user feedback).

Other user feedback configurations that may be made relate to parameters received from the user (e.g., how many time series datapoints they indicate for review as part of a final datapoint set, what event type predictions they indicate for review; what model type predictions they indicate for review, what specific time series datapoints they indicate for review, etc.). In certain embodiments, filtering the time series datapoints to determine the final datapoint set may be done randomly.

At 810, the final datapoint set obtained from 804, 806, and 808 is presented to a user for feedback.

At 812, feedback is received from the user for at least one datapoint within the filtered time series datapoints. The feedback may be in the form of a label that identifies whether the respective anomaly prediction was correct or not, what event type should have been predicted, what model instance hyperparameters should have been used, and/or what model type should have been predicted. One having ordinary skill in the art and having the benefit of the present disclosure would recognize other ways in which feedback may be prompted for and received.

In certain embodiments, after feedback is received at 812, a determination may be made as to whether the feedback should be used to update the model catalog in the runtime environment and/or stored in a labeled data storage. The determination may be made based on the annotation system configuration, based on the feedback received, based on an indication from the user, etc.

At 814, the feedback may be used to update the model catalog in the runtime environment. An update to the selected model instance and/or model instance hyperparameters in the model catalog may be performed using the received user feedback to create an updated model catalog entry. For example, if the feedback identified an incorrect anomaly prediction (a datapoint anomaly event was predicted incorrectly), the feedback may be used to update the model catalog for the same entry associated with the mapping identifier that was used to obtain the model from the model catalog that was updated.

To update the model catalog (e.g., the model catalog used by the runtime environment), the labeled user feedback may be used as ground truth data to perform one or more further machine learning training iterations to train and/or fine-tune the corresponding model instance and/or model instance hyperparameters. In certain embodiments, the model instance and/or model instance hyperparameters from the model catalog that were used to generate the anomaly predictions received at 802 are the model instance and/or model instance hyperparameters that are further trained and tuned. By further training and tuning the model instance and/or the model instance hyperparameters, the further trained model instance and/or model instance hyperparameters may be capable of generating anomaly predictions with increased accuracy for subsequent time series data and for the time series data that was received at 802.

At 816, the further trained model instance and model instance hyperparameters may be used to generate an updated prediction.

At 818, after the updated prediction is generated at 816, the prediction may be output. The output may be used to perform 804 again, and subsequent processing. Thus, it is possible that user feedback may be received for one or more anomaly predictions made by a model instance and corresponding model instance hyperparameters more than once (e.g., until accuracy is above a certain threshold, until the user does not give any more feedback, until a certain number of feedback iterations have taken place, based on a per-user limit, etc.).

Such processes may allow for a model instance and model instance hyperparameters to become better trained and more finely tuned, so as to increase the accuracy of subsequent anomaly predictions made using the further trained model instance and tuned model instance hyperparameters associated with the same mapping identifier in the model catalog. Accordingly, the processes may allow for the runtime environment model catalog to be developed independently of an offline runtime environment model catalog.

Thus, in certain embodiments, the offline training may develop a starting point for a model catalog that is used by the runtime environment, then the runtime environment may be capable of further developing the model catalog for increased accuracy in the predictions made in the runtime environment. Therefore, a runtime environment may be capable of developing model instances that are subjectively and/or objectively more accurate than the initial model catalog generated in an offline training environment and that may have been provided to the runtime environment as a starting point for part or all of a model catalog.

Additionally, or alternatively to 814 being performed after 812, 820 may be performed.

At 820, received user feedback from 812 may be stored in the labeled data storage. The feedback may comprise labeled time series data. In certain embodiments, the feedback may be stored regardless of the feedback indicating an anomaly occurring where a prediction had not, or vice versa.

The labeled storage data may be capable of being used in various ways. For example, the labeled data storage may be used for further analysis and/or machine learning model training (e.g., in an offline environment).

In certain embodiments, during 822, the labeled data storage may be used for offline training of the multitask model and/or entries of a model catalog (e.g., training a model instance and tuning model instance hyperparameters). 822 may be performed because the multitask model may not be configured to be further trained in the runtime environment and/or may cause increased latency if trained in the runtime environment.

Infrastructure as a Service

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 9:
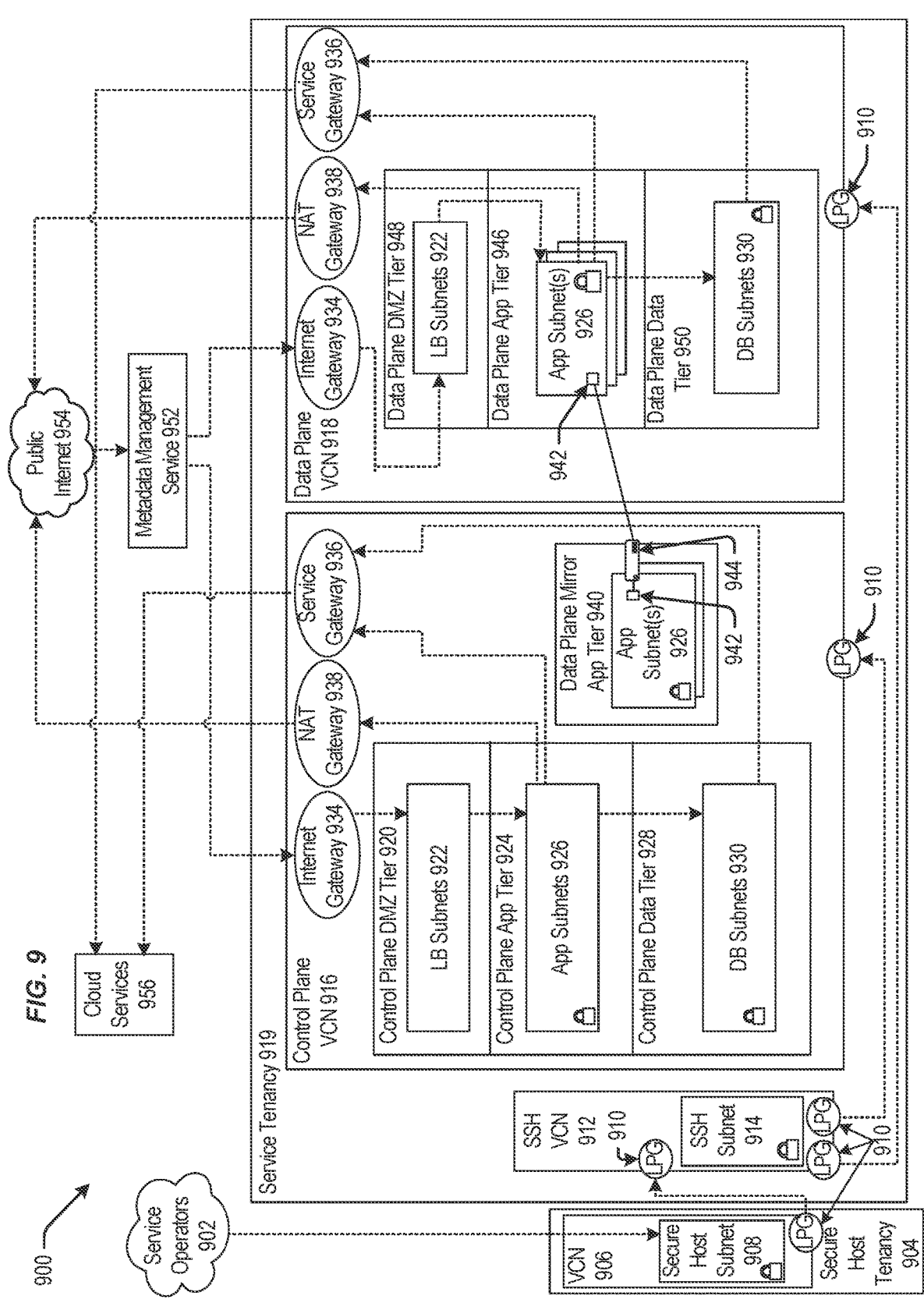
FIG. 9 is a block diagram illustrating one pattern for implementing a cloud infrastructure as a service system, according to at least one embodiment.

FIG. 9 is a block diagram 900 illustrating an example pattern of an IaaS architecture, according to at least one embodiment. Service operators 902 can be communicatively coupled to a secure host tenancy 904 that can include a virtual cloud network (VCN) 906 and a secure host subnet 908. In some examples, the service operators 902 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 906 and/or the Internet.

The VCN 906 can include a local peering gateway (LPG) 910 that can be communicatively coupled to a secure shell (SSH) VCN 912 via an LPG 910 contained in the SSH VCN 912. The SSH VCN 912 can include an SSH subnet 914, and the SSH VCN 912 can be communicatively coupled to a control plane VCN 916 via the LPG 910 contained in the control plane VCN 916. Also, the SSH VCN 912 can be communicatively coupled to a data plane VCN 918 via an LPG 910. The control plane VCN 916 and the data plane VCN 918 can be contained in a service tenancy 919 that can be owned and/or operated by the IaaS provider.

The control plane VCN 916 can include a control plane demilitarized zone (DMZ) tier 920 that acts as a perimeter network (e.g., portions of a corporate network between the corporate intranet and external networks). e DMZ-based servers may have restricted responsibilities and help keep breaches contained. Additionally, the DMZ tier 920 can include one or more load balancer (LB) subnet(s) 922, a control plane app tier 924 that can include app subnet(s) 926, a control plane data tier 928 that can include database (DB) subnet(s) 930 (e.g., frontend DB subnet(s) and/or backend DB subnet(s)). The LB subnet(s) 922 contained in the control plane DMZ tier 920 can be communicatively coupled to the app subnet(s) 926 contained in the control plane app tier 924 and an Internet gateway 934 that can be contained in the control plane VCN 916, and the app subnet(s) 926 can be communicatively coupled to the DB subnet(s) 930 contained in the control plane data tier 928 and a service gateway 936 and a network address translation (NAT) gateway 938. The control plane VCN 916 can include the service gateway 936 and the NAT gateway 938.

The control plane VCN 916 can include a data plane mirror app tier 940 that can include app subnet(s) 926. The app subnet(s) 926 contained in the data plane mirror app tier 940 can include a virtual network interface controller (VNIC) 942 that can execute a compute instance 944. The compute instance 944 can communicatively couple the app subnet(s) 926 of the data plane mirror app tier 940 to app subnet(s) 926 that can be contained in a data plane app tier 946.

The data plane VCN 918 can include the data plane app tier 946, a data plane DMZ tier 948, and a data plane data tier 950. The data plane DMZ tier 948 can include LB subnet(s) 922 that can be communicatively coupled to the app subnet(s) 926 of the data plane app tier 946 and the Internet gateway 934 of the data plane VCN 918. The app subnet(s) 926 can be communicatively coupled to the service gateway 936 of the data plane VCN 918 and the NAT gateway 938 of the data plane VCN 918. The data plane data tier 950 can also include the DB subnet(s) 930 that can be communicatively coupled to the app subnet(s) 926 of the data plane app tier 946.

The Internet gateway 934 of the control plane VCN 916 and of the data plane VCN 918 can be communicatively coupled to a metadata management service 952 that can be communicatively coupled to public Internet 954. Public Internet 954 can be communicatively coupled to the NAT gateway 938 of the control plane VCN 916 and of the data plane VCN 918. The service gateway 936 of the control plane VCN 916 and of the data plane VCN 918 can be communicatively couple to cloud services 956.

In some examples, the service gateway 936 of the control plane VCN 916 or of the data plane VCN 918 can make application programming interface (API) calls to cloud services 956 without going through public Internet 954. The API calls to cloud services 956 from the service gateway 936 can be one-way: the service gateway 936 can make API calls to cloud services 956, and cloud services 956 can send requested data to the service gateway 936. But, cloud services 956 may not initiate API calls to the service gateway 936.

In some examples, the secure host tenancy 904 can be directly connected to the service tenancy 919, which may be otherwise isolated. The secure host subnet 908 can communicate with the SSH subnet 914 through an LPG 910 that may enable two-way communication over an otherwise isolated system. Connecting the secure host subnet 908 to the SSH subnet 914 may give the secure host subnet 908 access to other entities within the service tenancy 919.

The control plane VCN 916 may allow users of the service tenancy 919 to set up or otherwise provision desired resources. Desired resources provisioned in the control plane VCN 916 may be deployed or otherwise used in the data plane VCN 918. In some examples, the control plane VCN 916 can be isolated from the data plane VCN 918, and the data plane mirror app tier 940 of the control plane VCN 916 can communicate with the data plane app tier 946 of the data plane VCN 918 via VNICs 942 that can be contained in the data plane mirror app tier 940 and the data plane app tier 946.

In some examples, users of the system, or customers, can make requests, for example create, read, update, or delete (CRUD) operations, through public Internet 954 that can communicate the requests to the metadata management service 952. The metadata management service 952 can communicate the request to the control plane VCN 916 through the Internet gateway 934. The request can be received by the LB subnet(s) 922 contained in the control plane DMZ tier 920. The LB subnet(s) 922 may determine that the request is valid, and in response to this determination, the LB subnet(s) 922 can transmit the request to app subnet(s) 926 contained in the control plane app tier 924. If the request is validated and requires a call to public Internet 954, the call to public Internet 954 may be transmitted to the NAT gateway 938 that can make the call to public Internet 954. Metadata that may be desired to be stored by the request can be stored in the DB subnet(s) 930.

In some examples, the data plane mirror app tier 940 can facilitate direct communication between the control plane VCN 916 and the data plane VCN 918. For example, changes, updates, or other suitable modifications to configuration may be desired to be applied to the resources contained in the data plane VCN 918. Via a VNIC 942, the control plane VCN 916 can directly communicate with, and can thereby execute the changes, updates, or other suitable modifications to configuration to, resources contained in the data plane VCN 918.

In certain embodiments, the control plane VCN 916 and the data plane VCN 918 can be contained in the service tenancy 919. In this case, the user, or the customer, of the system may not own or operate either the control plane VCN 916 or the data plane VCN 918. Instead, the IaaS provider may own or operate the control plane VCN 916 and the data plane VCN 918, both of which may be contained in the service tenancy 919. This embodiment can enable isolation of networks that may prevent users or customers from interacting with other users', or other customers', resources. Also, this embodiment may allow users or customers of the system to store databases privately without needing to rely on public Internet 954, which may not have a desired level of threat prevention, for storage.

In other embodiments, the LB subnet(s) 922 contained in the control plane VCN 916 can be configured to receive a signal from the service gateway 936. In this embodiment, the control plane VCN 916 and the data plane VCN 918 may be configured to be called by a customer of the IaaS provider without calling public Internet 954. Customers of the IaaS provider may desire this embodiment since database(s) that the customers use may be controlled by the IaaS provider and may be stored on the service tenancy 919, which may be isolated from public Internet 954.

Figure 10:
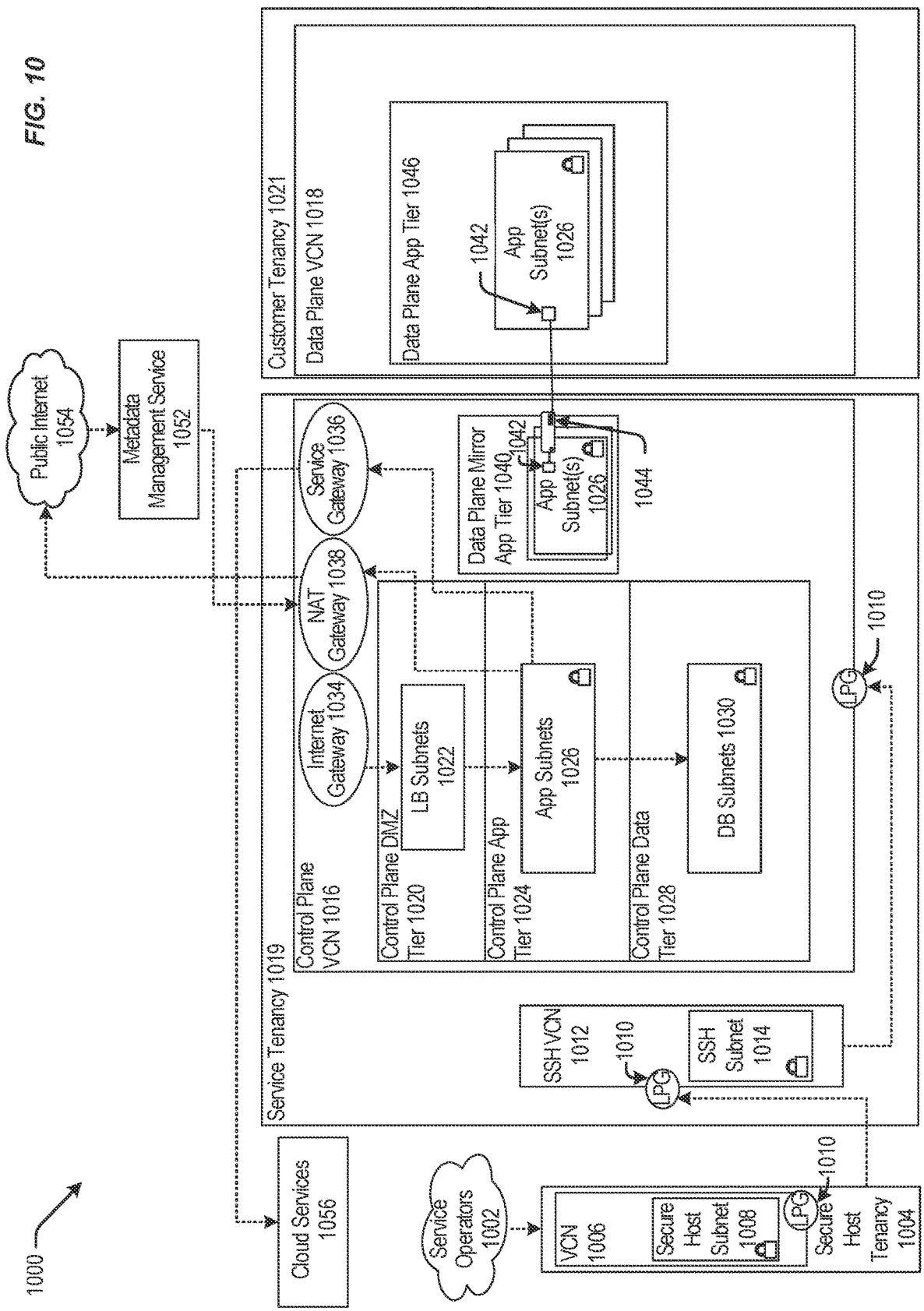
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g., service operators 902 of FIG. 9) can be communicatively coupled to a secure host tenancy 1004 (e.g., the secure host tenancy 904 of FIG. 9) that can include a virtual cloud network (VCN) 1006 (e.g., the VCN 906 of FIG. 9) and a secure host subnet 1008 (e.g., the secure host subnet 908 of FIG. 9). The VCN 1006 can include a local peering gateway (LPG) 1010 (e.g., the LPG 910 of FIG. 9) that can be communicatively coupled to a secure shell (SSH) VCN 1012 (e.g., the SSH VCN 912 of FIG. 9) via an LPG 910 contained in the SSH VCN 1012. The SSH VCN 1012 can include an SSH subnet 1014 (e.g., the SSH subnet 914 of FIG. 9), and the SSH VCN 1012 can be communicatively coupled to a control plane VCN 1016 (e.g., the control plane VCN 916 of FIG. 9) via an LPG 1010 contained in the control plane VCN 1016. The control plane VCN 1016 can be contained in a service tenancy 1019 (e.g., the service tenancy 919 of FIG. 9), and the data plane VCN 1018 (e.g., the data plane VCN 918 of FIG. 9) can be contained in a customer tenancy 1021 that may be owned or operated by users, or customers, of the system.

The control plane VCN 1016 can include a control plane DMZ tier 1020 (e.g., the control plane DMZ tier 920 of FIG. 9) that can include LB subnet(s) 1022 (e.g., LB subnet(s) 922 of FIG. 9), a control plane app tier 1024 (e.g., the control plane app tier 924 of FIG. 9) that can include app subnet(s) 1026 (e.g., app subnet(s) 926 of FIG. 9), a control plane data tier 1028 (e.g., the control plane data tier 928 of FIG. 9) that can include database (DB) subnet(s) 1030 (e.g., similar to DB subnet(s) 930 of FIG. 9). The LB subnet(s) 1022 contained in the control plane DMZ tier 1020 can be communicatively coupled to the app subnet(s) 1026 contained in the control plane app tier 1024 and an Internet gateway 1034 (e.g., the Internet gateway 934 of FIG. 9) that can be contained in the control plane VCN 1016, and the app subnet(s) 1026 can be communicatively coupled to the DB subnet(s) 1030 contained in the control plane data tier 1028 and a service gateway 1036 (e.g., the service gateway 936 of FIG. 9) and a network address translation (NAT) gateway 1038 (e.g., the NAT gateway 938 of FIG. 9). The control plane VCN 1016 can include the service gateway 1036 and the NAT gateway 1038.

The control plane VCN 1016 can include a data plane mirror app tier 1040 (e.g., the data plane mirror app tier 940 of FIG. 9) that can include app subnet(s) 1026. The app subnet(s) 1026 contained in the data plane mirror app tier 1040 can include a virtual network interface controller (VNIC) 1042 (e.g., the VNIC of 942) that can execute a compute instance 1044 (e.g., similar to the compute instance 944 of FIG. 9). The compute instance 1044 can facilitate communication between the app subnet(s) 1026 of the data plane mirror app tier 1040 and the app subnet(s) 1026 that can be contained in a data plane app tier 1046 (e.g., the data plane app tier 946 of FIG. 9) via the VNIC 1042 contained in the data plane mirror app tier 1040 and the VNIC 1042 contained in the data plane app tier 1046.

The Internet gateway 1034 contained in the control plane VCN 1016 can be communicatively coupled to a metadata management service 1052 (e.g., the metadata management service 952 of FIG. 9) that can be communicatively coupled to public Internet 1054 (e.g., public Internet 954 of FIG. 9). Public Internet 1054 can be communicatively coupled to the NAT gateway 1038 contained in the control plane VCN 1016. The service gateway 1036 contained in the control plane VCN 1016 can be communicatively couple to cloud services 1056 (e.g., cloud services 956 of FIG. 9).

In some examples, the data plane VCN 1018 can be contained in the customer tenancy 1021. In this case, the IaaS provider may provide the control plane VCN 1016 for each customer, and the IaaS provider may, for each customer, set up a unique compute instance 1044 that is contained in the service tenancy 1019. Each compute instance 1044 may allow communication between the control plane VCN 1016, contained in the service tenancy 1019, and the data plane VCN 1018 that is contained in the customer tenancy 1021. The compute instance 1044 may allow resources, that are provisioned in the control plane VCN 1016 that is contained in the service tenancy 1019, to be deployed or otherwise used in the data plane VCN 1018 that is contained in the customer tenancy 1021.

In other examples, the customer of the IaaS provider may have databases that live in the customer tenancy 1021. In this example, the control plane VCN 1016 can include the data plane mirror app tier 1040 that can include app subnet(s) 1026. The data plane mirror app tier 1040 can reside in the data plane VCN 1018, but the data plane mirror app tier 1040 may not live in the data plane VCN 1018. That is, the data plane mirror app tier 1040 may have access to the customer tenancy 1021, but the data plane mirror app tier 1040 may not exist in the data plane VCN 1018 or be owned or operated by the customer of the IaaS provider. The data plane mirror app tier 1040 may be configured to make calls to the data plane VCN 1018 but may not be configured to make calls to any entity contained in the control plane VCN 1016. The customer may desire to deploy or otherwise use resources in the data plane VCN 1018 that are provisioned in the control plane VCN 1016, and the data plane mirror app tier 1040 can facilitate the desired deployment, or other usage of resources, of the customer.

In certain embodiments, the customer of the IaaS provider can apply filters to the data plane VCN 1018. In this embodiment, the customer can determine what the data plane VCN 1018 can access, and the customer may restrict access to public Internet 1054 from the data plane VCN 1018. The IaaS provider may not be able to apply filters or otherwise control access of the data plane VCN 1018 to any outside networks or databases. Applying filters and controls by the customer onto the data plane VCN 1018, contained in the customer tenancy 1021, can help isolate the data plane VCN 1018 from other customers and from public Internet 1054.

In certain embodiments, cloud services 1056 can be called by the service gateway 1036 to access services that may not exist on public Internet 1054, on the control plane VCN 1016, or on the data plane VCN 1018. The connection between cloud services 1056 and the control plane VCN 1016 or the data plane VCN 1018 may not be live or continuous. Cloud services 1056 may exist on a different network owned or operated by the IaaS provider. Cloud services 1056 may be configured to receive calls from the service gateway 1036 and may be configured to not receive calls from public Internet 1054. Some cloud services 1056 may be isolated from other cloud services 1056, and the control plane VCN 1016 may be isolated from cloud services 1056 that may not be in the same region as the control plane VCN 1016. For example, the control plane VCN 1016 may be located in "Region 1," and cloud service "Deployment 9," may be located in Region 1 and in "Region 2." If a call to Deployment 9 is made by the service gateway 1036 contained in the control plane VCN 1016 located in Region 1, the call may be transmitted to Deployment 9 in Region 1. In this example, the control plane VCN 1016, or Deployment 9 in Region 1, may not be communicatively coupled to, or otherwise in communication with, Deployment 9 in Region 2.

Figure 11:
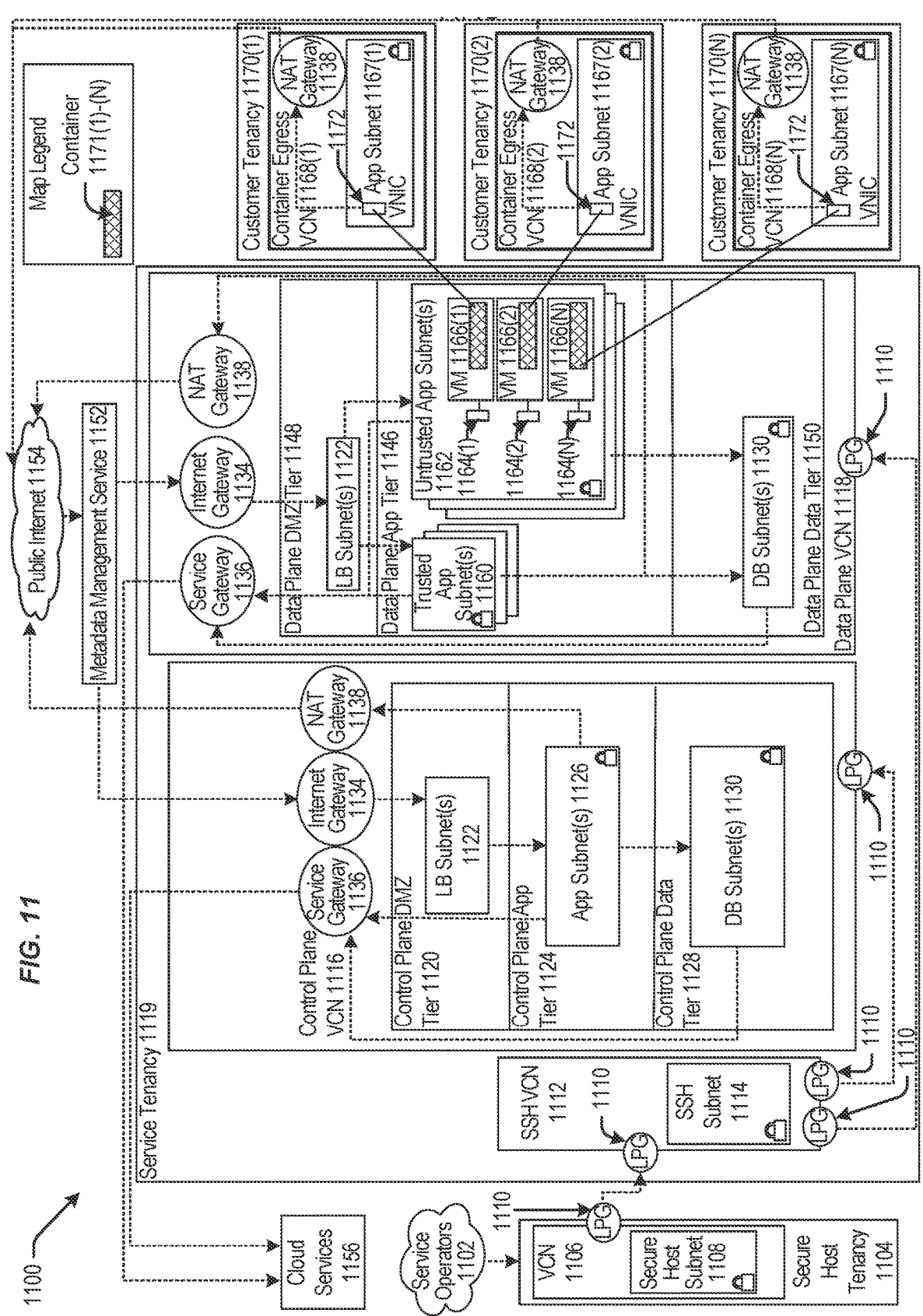
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g., service operators 902 of FIG. 9) can be communicatively coupled to a secure host tenancy 1104 (e.g., the secure host tenancy 904 of FIG. 9) that can include a virtual cloud network (VCN) 1106 (e.g., the VCN 906 of FIG. 9) and a secure host subnet 1108 (e.g., the secure host subnet 908 of FIG. 9). The VCN 1106 can include an LPG 1110 (e.g., the LPG 910 of FIG. 9) that can be communicatively coupled to an SSH VCN 1112 (e.g., the SSH VCN 912 of FIG. 9) via an LPG 1110 contained in the SSH VCN 1112. The SSH VCN 1112 can include an SSH subnet 1114 (e.g., the SSH subnet 914 of FIG. 9), and the SSH VCN 1112 can be communicatively coupled to a control plane VCN 1116 (e.g., the control plane VCN 916 of FIG. 9) via an LPG 1110 contained in the control plane VCN 1116 and to a data plane VCN 1118 (e.g., the data plane 918 of FIG. 9) via an LPG 1110 contained in the data plane VCN 1118. The control plane VCN 1116 and the data plane VCN 1118 can be contained in a service tenancy 1119 (e.g., the service tenancy 919 of FIG. 9).

The control plane VCN 1116 can include a control plane DMZ tier 1120 (e.g., the control plane DMZ tier 920 of FIG. 9) that can include load balancer (LB) subnet(s) 1122 (e.g., LB subnet(s) 922 of FIG. 9), a control plane app tier 1124 (e.g., the control plane app tier 924 of FIG. 9) that can include app subnet(s) 1126 (e.g., similar to app subnet(s) 926 of FIG. 9), a control plane data tier 1128 (e.g., the control plane data tier 928 of FIG. 9) that can include DB subnet(s) 1130. The LB subnet(s) 1122 contained in the control plane DMZ tier 1120 can be communicatively coupled to the app subnet(s) 1126 contained in the control plane app tier 1124 and to an Internet gateway 1134 (e.g., the Internet gateway 934 of FIG. 9) that can be contained in the control plane VCN 1116, and the app subnet(s) 1126 can be communicatively coupled to the DB subnet(s) 1130 contained in the control plane data tier 1128 and to a service gateway 1136 (e.g., the service gateway of FIG. 9) and a network address translation (NAT) gateway 1138 (e.g., the NAT gateway 938 of FIG. 9). The control plane VCN 1116 can include the service gateway 1136 and the NAT gateway 1138.

The data plane VCN 1118 can include a data plane app tier 1146 (e.g., the data plane app tier 946 of FIG. 9), a data plane DMZ tier 1148 (e.g., the data plane DMZ tier 948 of FIG. 9), and a data plane data tier 1150 (e.g., the data plane data tier 950 of FIG. 9). The data plane DMZ tier 1148 can include LB subnet(s) 1122 that can be communicatively coupled to trusted app subnet(s) 1160 and untrusted app subnet(s) 1162 of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include one or more primary VNICs 1164(1)-(N) that can be communicatively coupled to tenant virtual machines (VMs) 1166(1)-(N). Each tenant VM 1166(1)-(N) can be communicatively coupled to a respective app subnet 1167(1)-(N) that can be contained in respective container egress VCNs 1168(1)-(N) that can be contained in respective customer tenancies 1170(1)-(N). Respective secondary VNICs 1172(1)-(N) can facilitate communication between the untrusted app subnet(s) 1162 contained in the data plane VCN 1118 and the app subnet contained in the container egress VCNs 1168(1)-(N). Each container egress VCNs 1168(1)-(N) can include a NAT gateway 1138 that can be communicatively coupled to public Internet 1154 (e.g., public Internet 954 of FIG. 9).

The Internet gateway 1134 contained in the control plane VCN 1116 and contained in the data plane VCN 1118 can be communicatively coupled to a metadata management service 1152 (e.g., the metadata management system 952 of FIG. 9) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively couple to cloud services 1156.

In certain embodiments, the data plane VCN 1118 can be integrated with customer tenancies 1170. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1146. Code to run the function may be executed in the VMs 1166(1)-(N), and the code may not be configured to run anywhere else on the data plane VCN 1118. Each VM 1166(1)-(N) may be connected to one customer tenancy 1170. Respective containers 1171(1)-(N) contained in the VMs 1166(1)-(N) may be configured to run the code. In this case, there can be a dual isolation (e.g., the containers 1171(1)-(N) running code, where the containers 1171(1)-(N) may be contained in at least the VM 1166(1)-(N) that are contained in the untrusted app subnet(s) 1162), which may help prevent incorrect or otherwise undesirable code from damaging the network of the IaaS provider or from damaging a network of a different customer. The containers 1171(1)-(N) may be communicatively coupled to the customer tenancy 1170 and may be configured to transmit or receive data from the customer tenancy 1170. The containers 1171(1)-(N) may not be configured to transmit or receive data from any other entity in the data plane VCN 1118. Upon completion of running the code, the IaaS provider may kill or otherwise dispose of the containers 1171(1)-(N).

In certain embodiments, the trusted app subnet(s) 1160 may run code that may be owned or operated by the IaaS provider. In this embodiment, the trusted app subnet(s) 1160 may be communicatively coupled to the DB subnet(s) 1130 and be configured to execute CRUD operations in the DB subnet(s) 1130. The untrusted app subnet(s) 1162 may be communicatively coupled to the DB subnet(s) 1130, but in this embodiment, the untrusted app subnet(s) may be configured to execute read operations in the DB subnet(s) 1130. The containers 1171(1)-(N) that can be contained in the VM 1166(1)-(N) of each customer and that may run code from the customer may not be communicatively coupled with the DB subnet(s) 1130.

In other embodiments, the control plane VCN 1116 and the data plane VCN 1118 may not be directly communicatively coupled. In this embodiment, there may be no direct communication between the control plane VCN 1116 and the data plane VCN 1118. However, communication can occur indirectly through at least one method. An LPG 1110 may be established by the IaaS provider that can facilitate communication between the control plane VCN 1116 and the data plane VCN 1118. In another example, the control plane VCN 1116 or the data plane VCN 1118 can make a call to cloud services 1156 via the service gateway 1136. For example, a call to cloud services 1156 from the control plane VCN 1116 can include a request for a service that can communicate with the data plane VCN 1118.

Figure 12:
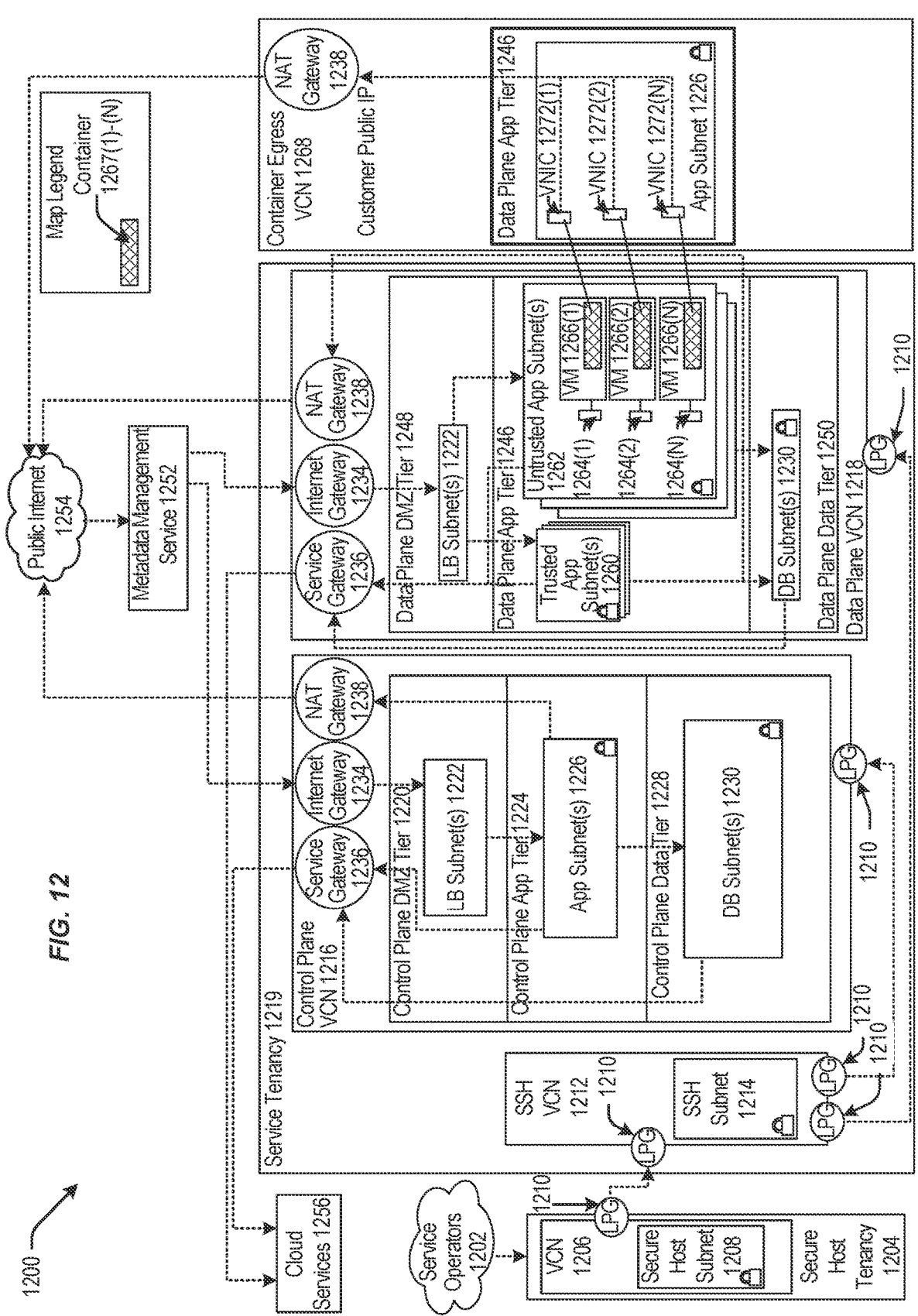
FIG. 12 is a block diagram illustrating another pattern for implementing a cloud infrastructure as a service system, according to at least one embodiment.

FIG. 12 is a block diagram 1200 illustrating another example pattern of an IaaS architecture, according to at least one embodiment. Service operators 1202 (e.g., service operators 902 of FIG. 9) can be communicatively coupled to a secure host tenancy 1204 (e.g., the secure host tenancy 904 of FIG. 9) that can include a virtual cloud network (VCN) 1206 (e.g., the VCN 906 of FIG. 9) and a secure host subnet 1208 (e.g., the secure host subnet 908 of FIG. 9). The VCN 1206 can include an LPG 1210 (e.g., the LPG 910 of FIG. 9) that can be communicatively coupled to an SSH VCN 1212 (e.g., the SSH VCN 912 of FIG. 9) via an LPG 1210 contained in the SSH VCN 1212. The SSH VCN 1212 can include an SSH subnet 1214 (e.g., the SSH subnet 914 of FIG. 9), and the SSH VCN 1212 can be communicatively coupled to a control plane VCN 1216 (e.g., the control plane VCN 916 of FIG. 9) via an LPG 1210 contained in the control plane VCN 1216 and to a data plane VCN 1218 (e.g., the data plane 918 of FIG. 9) via an LPG 1210 contained in the data plane VCN 1218. The control plane VCN 1216 and the data plane VCN 1218 can be contained in a service tenancy 1219 (e.g., the service tenancy 919 of FIG. 9).

The control plane VCN 1216 can include a control plane DMZ tier 1220 (e.g., the control plane DMZ tier 920 of FIG. 9) that can include LB subnet(s) 1222 (e.g., LB subnet(s) 922 of FIG. 9), a control plane app tier 1224 (e.g., the control plane app tier 924 of FIG. 9) that can include app subnet(s) 1226 (e.g., app subnet(s) 926 of FIG. 9), a control plane data tier 1228 (e.g., the control plane data tier 928 of FIG. 9) that can include DB subnet(s) 1230 (e.g., DB subnet(s) 1130 of FIG. 11). The LB subnet(s) 1222 contained in the control plane DMZ tier 1220 can be communicatively coupled to the app subnet(s) 1226 contained in the control plane app tier 1224 and to an Internet gateway 1234 (e.g., the Internet gateway 934 of FIG. 9) that can be contained in the control plane VCN 1216, and the app subnet(s) 1226 can be communicatively coupled to the DB subnet(s) 1230 contained in the control plane data tier 1228 and to a service gateway 1236 (e.g., the service gateway of FIG. 9) and a network address translation (NAT) gateway 1238 (e.g., the NAT gateway 938 of FIG. 9). The control plane VCN 1216 can include the service gateway 1236 and the NAT gateway 1238.

The data plane VCN 1218 can include a data plane app tier 1246 (e.g., the data plane app tier 946 of FIG. 9), a data plane DMZ tier 1248 (e.g., the data plane DMZ tier 948 of FIG. 9), and a data plane data tier 1250 (e.g., the data plane data tier 950 of FIG. 9). The data plane DMZ tier 1248 can include LB subnet(s) 1222 that can be communicatively coupled to trusted app subnet(s) 1260 (e.g., trusted app subnet(s) 1160 of FIG. 11) and untrusted app subnet(s) 1262 (e.g., untrusted app subnet(s) 1162 of FIG. 11) of the data plane app tier 1246 and the Internet gateway 1234 contained in the data plane VCN 1218. The trusted app subnet(s) 1260 can be communicatively coupled to the service gateway 1236 contained in the data plane VCN 1218, the NAT gateway 1238 contained in the data plane VCN 1218, and DB subnet(s) 1230 contained in the data plane data tier 1250. The untrusted app subnet(s) 1262 can be communicatively coupled to the service gateway 1236 contained in the data plane VCN 1218 and DB subnet(s) 1230 contained in the data plane data tier 1250. The data plane data tier 1250 can include DB subnet(s) 1230 that can be communicatively coupled to the service gateway 1236 contained in the data plane VCN 1218.

The untrusted app subnet(s) 1262 can include primary VNICs 1264(1)-(N) that can be communicatively coupled to tenant virtual machines (VMs) 1266(1)-(N) residing within the untrusted app subnet(s) 1262. Each tenant VM 1266(1)-(N) can run code in a respective container 1267(1)-(N), and be communicatively coupled to an app subnet 1226 that can be contained in a data plane app tier 1246 that can be contained in a container egress VCN 1268. Respective secondary VNICs 1272(1)-(N) can facilitate communication between the untrusted app subnet(s) 1262 contained in the data plane VCN 1218 and the app subnet contained in the container egress VCN 1268. The container egress VCN can include a NAT gateway 1238 that can be communicatively coupled to public Internet 1254 (e.g., public Internet 954 of FIG. 9).

The Internet gateway 1234 contained in the control plane VCN 1216 and contained in the data plane VCN 1218 can be communicatively coupled to a metadata management service 1252 (e.g., the metadata management system 952 of FIG. 9) that can be communicatively coupled to public Internet 1254. Public Internet 1254 can be communicatively coupled to the NAT gateway 1238 contained in the control plane VCN 1216 and contained in the data plane VCN 1218. The service gateway 1236 contained in the control plane VCN 1216 and contained in the data plane VCN 1218 can be communicatively couple to cloud services 1256.

In some examples, the pattern illustrated by the architecture of block diagram 1200 of FIG. 12 may be considered an exception to the pattern illustrated by the architecture of block diagram 1100 of FIG. 11 and may be desirable for a customer of the IaaS provider if the IaaS provider cannot directly communicate with the customer (e.g., a disconnected region). The respective containers 1267(1)-(N) that are contained in the VMs 1266(1)-(N) for each customer can be accessed in real-time by the customer. The containers 1267(1)-(N) may be configured to make calls to respective secondary VNICs 1272(1)-(N) contained in app subnet(s) 1226 of the data plane app tier 1246 that can be contained in the container egress VCN 1268. The secondary VNICs 1272(1)-(N) can transmit the calls to the NAT gateway 1238 that may transmit the calls to public Internet 1254. In this example, the containers 1267(1)-(N) that can be accessed in real-time by the customer can be isolated from the control plane VCN 1216 and can be isolated from other entities contained in the data plane VCN 1218. The containers 1267(1)-(N) may also be isolated from resources from other customers.

In other examples, the customer can use the containers 1267(1)-(N) to call cloud services 1256. In this example, the customer may run code in the containers 1267(1)-(N) that requests a service from cloud services 1256. The containers 1267(1)-(N) can transmit this request to the secondary VNICs 1272(1)-(N) that can transmit the request to the NAT gateway that can transmit the request to public Internet 1254. Public Internet 1254 can transmit the request to LB subnet(s) 1222 contained in the control plane VCN 1216 via the Internet gateway 1234. In response to determining the request is valid, the LB subnet(s) can transmit the request to app subnet(s) 1226 that can transmit the request to cloud services 1256 via the service gateway 1236.

It should be appreciated that IaaS architectures 900, 1000, 1100, 1200 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 13:
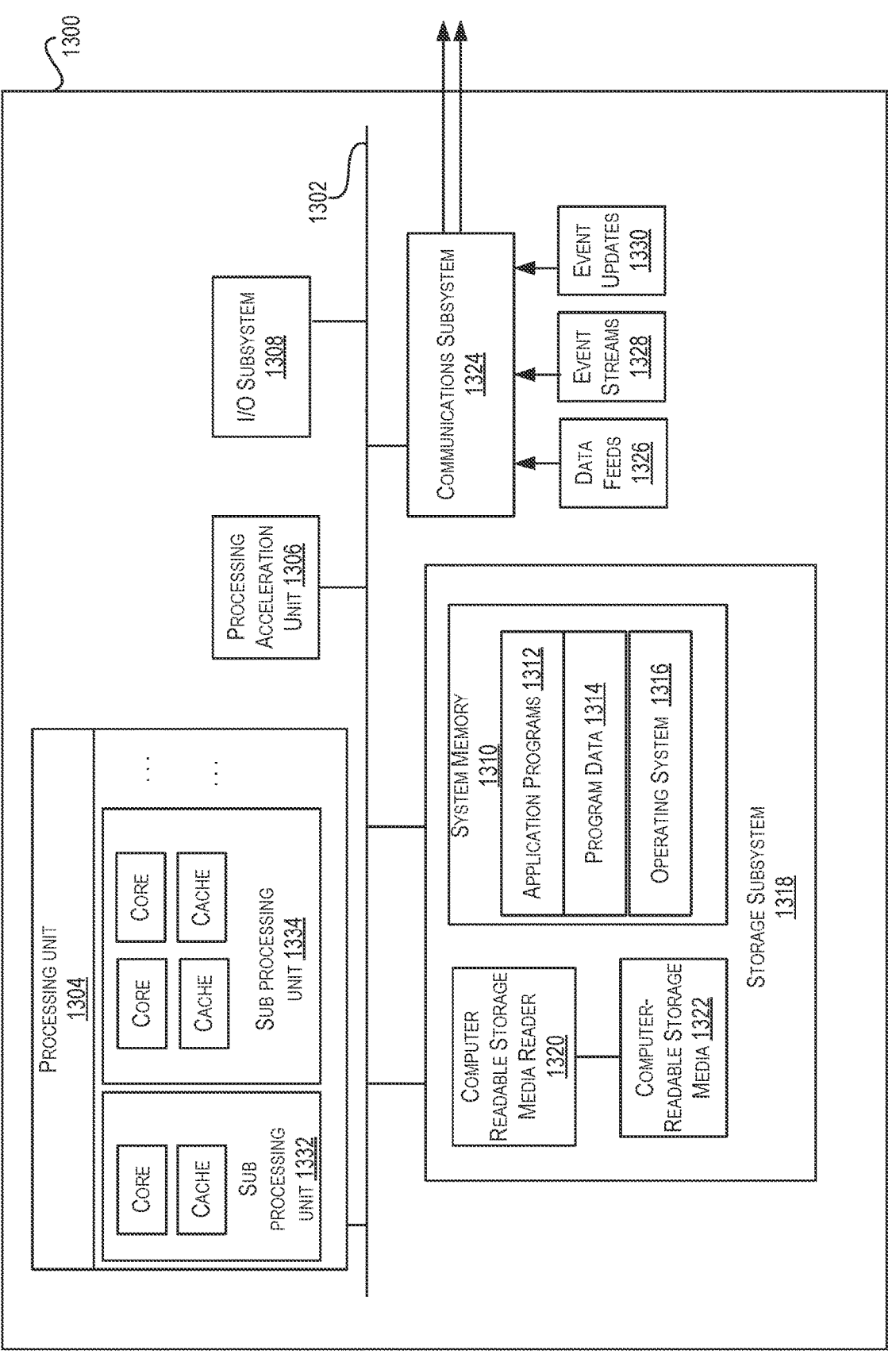
FIG. 13 is a block diagram illustrating an example computer system, according to at least one embodiment.

FIG. 13 illustrates an example computer system 1300, in which various embodiments may be implemented. The system 1300 may be used to implement any of the computer systems described above. As shown in the figure, computer system 1300 includes a processing unit 1304 that communicates with a number of peripheral subsystems via a bus subsystem 1302. These peripheral subsystems may include a processing acceleration unit 1306, an I/O subsystem 1308, a storage subsystem 1318 and a communications subsystem 1324. Storage subsystem 1318 includes tangible computer-readable storage media 1322 and a system memory 1310.

Bus subsystem 1302 provides a mechanism for letting the various components and subsystems of computer system 1300 communicate with each other as intended. Although bus subsystem 1302 is shown schematically as a single bus, alternative embodiments of the bus subsystem may utilize multiple buses. Bus subsystem 1302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1304, which can be implemented as one or more integrated circuits (e.g., a conventional microprocessor or microcontroller), controls the operation of computer system 1300. One or more processors may be included in processing unit 1304. These processors may include single core or multicore processors. In certain embodiments, processing unit 1304 may be implemented as one or more independent processing units 1332 and/or 1334 with single or multicore processors included in each processing unit. In other embodiments, processing unit 1304 may also be implemented as a quad-core processing unit formed by integrating two dual-core processors into a single chip.

In various embodiments, processing unit 1304 can execute a variety of programs in response to program code and can maintain multiple concurrently executing programs or processes. At any given time, some or all of the program code to be executed can be resident in processor(s) 1304 and/or in storage subsystem 1318. Through suitable programming, processor(s) 1304 can provide various functionalities described above. Computer system 1300 may additionally include a processing acceleration unit 1306, which can include a digital signal processor (DSP), a special-purpose processor, and/or the like.

I/O subsystem 1308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Sin navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1300 may comprise a storage subsystem 1318 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1304 provide the functionality described above. Storage subsystem 1318 may also provide a repository for storing data used in accordance with the present disclosure.

As depicted in the example in FIG. 13, storage subsystem 1318 can include various components including a system memory 1310, computer-readable storage media 1322, and a computer readable storage media reader 1320. System memory 1310 may store program instructions that are loadable and executable by processing unit 1304. System memory 1310 may also store data that is used during the execution of the instructions and/or data that is generated during the execution of the program instructions. Various different kinds of programs may be loaded into system memory 1310 including but not limited to client applications, Web browsers, mid-tier applications, relational database management systems (RDBMS), virtual machines, containers, etc.

System memory 1310 may also store an operating system 1316. Examples of operating system 1316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1300 executes one or more virtual machines, the virtual machines along with their guest operating systems (GOSs) may be loaded into system memory 1310 and executed by one or more processors or cores of processing unit 1304.

System memory 1310 can come in different configurations depending upon the type of computer system 1300. For example, system memory 1310 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1310 may include a basic input/output system (BIOS) containing basic routines that help to transfer information between elements within computer system 1300, such as during start-up.

Computer-readable storage media 1322 may represent remote, local, fixed, and/or removable storage devices plus storage media for temporarily and/or more permanently containing, storing, computer-readable information for use by computer system 1300 including instructions executable by processing unit 1304 of computer system 1300.

Computer-readable storage media 1322 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1322 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1322 may include, but is not limited to, Zip® drives, flash memory cards, universal serial bus (USB) flash drives, secure digital (SD) cards, DVD disks, digital video tape, and the like. Computer-readable storage media 1322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1300.

Machine-readable instructions executable by one or more processors or cores of processing unit 1304 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1324 provides an interface to other computer systems and networks. Communications subsystem 1324 serves as an interface for receiving data from and transmitting data to other systems from computer system 1300. For example, communications subsystem 1324 may enable computer system 1300 to connect to one or more devices via the Internet. In certain embodiments communications subsystem 1324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In certain embodiments communications subsystem 1324 can provide wired network connectivity (e.g., Ethernet) in addition to or instead of a wireless interface.

In certain embodiments, communications subsystem 1324 may also receive input communication in the form of structured and/or unstructured data feeds 1326, event streams 1328, event updates 1330, and the like on behalf of one or more users who may use computer system 1300.

By way of example, communications subsystem 1324 may be configured to receive data feeds 1326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1324 may also be configured to receive data in the form of continuous data streams, which may include event streams 1328 of real-time events and/or event updates 1330, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1324 may also be configured to output the structured and/or unstructured data feeds 1326, event streams 1328, event updates 1330, and the like to one or more databases that may be in communication with one or more streaming data source computers coupled to computer system 1300.

Computer system 1300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer implemented method comprising:
predicting, by an anomaly detection system and using a trained multitask model, a plurality of predictions for input time series data, the plurality of predictions comprising a first prediction identifying an anomaly event type present in the input time series data, and a second prediction identifying a model type to be used for the anomaly event type identified in the first prediction, the input time series data comprising a plurality of datapoints;
based upon the anomaly event type identified in the first prediction and the model type identified in the second prediction, selecting, by the anomaly detection system and from a plurality of trained model instances, a first trained model instance, the first trained model instance having an associated set of selected hyperparameter values for a set of hyperparameters;
predicting, by the anomaly detection system and using the first trained model instance and the associated set of selected hyperparameter values, a first anomaly event in the input time series data; and
outputting information indicative of the first anomaly event.

2. The method of claim 1, further comprising:
extracting a set of extracted features from the input time series data; and
wherein the predicting comprises using, by the anomaly detection system, the set of extracted features,
and wherein the selecting comprises using the set of extracted features, the first prediction, and the second prediction to select the first trained model instance.

3. The method of claim 2, wherein the set of extracted features is compared to one or more extracted feature vectors associated with the first trained model instance and results in a similarity metric within a defined threshold.

4. The method of claim 1, wherein the first anomaly event comprises more than one datapoint from the input time series data.

5. The method of claim 1, wherein the anomaly event type is at least one of: (i) a point-wise anomalous event type, (ii) a collective anomalous event type, or (iii) a contextual anomalous event type.

6. The method of claim 1, wherein the model type is at least one of: (i) a one-call SVM model, (ii) an isolated forest model, or (iii) an LSTM-based model.

7. The method of claim 1, further comprising:
training a baseline multitask model using a training time series dataset to generate the trained multitask model;
wherein the training time series dataset comprises a plurality of anomaly-indicating training datapoints, each anomaly-indicating training datapoint comprising a time, a value, and a ground truth, the ground truth comprising an anomaly event type label identifying an event type for an event occurring in the training time series dataset and a model type label identifying a model type suited for the anomaly event type identified by the anomaly event type label; and
wherein training the baseline multitask model comprises:
predicting a first plurality of training predictions using the baseline multitask model, the first plurality of training predictions comprising a first training prediction identifying an anomaly event type present in the input time series data, and a second training prediction identifying a model type to be used for the anomaly event type identified in the first training prediction, and updating model parameters associated with the baseline multitask model based upon the first plurality of training predictions and the ground truth associated with the training time series dataset.

8. The method of claim 7, further comprising:

predicting, using the trained multitask model, a second plurality of training predictions for the training time series dataset, the second plurality of training predictions comprising a first training prediction of the second plurality of training predictions identifying an anomaly event type present in the training time series dataset, and a second training prediction of the second plurality of training predictions identifying a model type to be used for the anomaly event type identified in the first training prediction of the second plurality of training predictions;

obtaining a first model instance of the model type identified in the first training prediction in the second plurality of training predictions; and training, using the training time series dataset, the first model instance to generate the first trained model instance, the training of the first model instance comprising:

obtaining, for the first trained model instance, the associated set of selected hyperparameter values, and storing the first trained model instance and the associated set of selected hyperparameter values.

9. The method of claim 8, further comprising:

obtaining a training data feature vector from the training time series dataset, the training data feature vector used to obtain the first model instance.

10. The method of claim 9, further comprising:

storing the training data feature vector, the first training prediction, and the second training prediction as mapping data and associating the mapping data with the first model instance.

11. The method of claim 10, wherein obtaining the first model instance comprises comparing the stored training data feature vector associated with the first model instance to a set of extracted features from the input time series data.

12. The method of claim 1, further comprising:

identifying a set of one or more datapoints from the plurality of datapoints in the input time series data; and for each datapoint in the set of one or more datapoints outputting, information indicative of a prediction made by the first trained model instance for the datapoint, and enabling input to be provided with respect to the information output for the datapoint.

13. The method of claim 12, wherein the identifying occurs based on at least one of: (i) a confidence score associated with the prediction made by the first trained model instance or (ii) an amount of time to label datapoints in the set of one or more datapoints associated with the prediction made by the first trained model instance.

14. The method of claim 12:

wherein the datapoint was predicted to be part of the first anomaly event;

the method further comprising:

responsive to receiving input indicating that the datapoint is not part of the first anomaly event, generating an updated first trained model instance;

predicting, by the anomaly detection system and using the updated first trained model instance and the associated set of selected hyperparameter values, a second anomaly event in the input time series data; and outputting information indicative of the second anomaly event.

15. The method of claim 12:

wherein the datapoint was predicted to be part of the first anomaly event;

the method further comprising:

responsive to receiving input indicating that the datapoint is not part of the first anomaly event, generating an updated first trained model instance and an updated associated set of selected hyperparameter values;

predicting, by the anomaly detection system and using the updated first trained model instance and the updated associated set of selected hyperparameter values, a second anomaly event in the input time series data; and outputting information indicative of the second anomaly event.

16. The method of claim 12:

wherein the datapoint was predicted not to be part of the first anomaly event;

the method further comprising:

responsive to receiving input indicating that the datapoint is part of the first anomaly event, generating an updated first trained model instance;

predicting, by the anomaly detection system and using the updated first trained model instance and the associated set of selected hyperparameter values, a second anomaly event in the input time series data; and outputting information indicative of the second anomaly event.

17. The method of claim 12:

wherein the datapoint was predicted to not be part of the first anomaly event;

the method further comprising:

responsive to receiving input indicating that the datapoint is part of the first anomaly event, generating an updated first trained model instance and an updated associated set of selected hyperparameter values;

predicting, by the anomaly detection system and using the updated first trained model instance and the updated associated set of selected hyperparameter values, a second anomaly event in the input time series data; and outputting information indicative of the second anomaly event.

18. The method of claim 12, further comprising:

receiving input indicating that a model type identified in the second prediction is incorrect; and responsive to receiving the input indicating that the model type identified in the second prediction is incorrect, fine-tuning the trained multitask model to create an updated trained multitask model.

19. One or more non-transitory computer-readable media storing a set of instructions, wherein the set of instructions when executed by one or more processors cause:

predicting, using a trained multitask model, a plurality of predictions for input time series data, the plurality of predictions comprising a first prediction identifying an anomaly event type present in the input time series data, and a second prediction identifying a model type to be used for the anomaly event type identified in the first prediction, the input time series data comprising a plurality of datapoints;

based upon the anomaly event type identified in the first prediction and the model type identified in the second prediction, selecting, from a plurality of trained model instances, a first trained model instance, the first trained model instance having an associated set of selected hyperparameter values for a set of hyperparameters;

predicting, using the first trained model instance and the associated set of selected hyperparameter values, a first anomaly event in the input time series data; and outputting information indicative of the first anomaly event.

20. An anomaly detection system comprising one or more processors, configured to:

predict, using a trained multitask model, a plurality of predictions for input time series data, the plurality of predictions comprising a first prediction identifying an anomaly event type present in the input time series data, and a second prediction identifying a model type to be used for the anomaly event type identified in the first prediction, the input time series data comprising a plurality of datapoints;

based upon the anomaly event type identified in the first prediction and the model type identified in the second prediction, selecting, from a plurality of trained model instances a first trained model instance, the first trained model instance having an associated set of selected hyperparameter values for a set of hyperparameters;

predict, using the first trained model instance and the associated set of selected hyperparameter values, a first anomaly event in the input time series data; and outputting information indicative of the first anomaly event.

\* \* \* \* \*